(12) United States Patent
Chen et al.

(10) Patent No.: US 10,542,834 B2
(45) Date of Patent: Jan. 28, 2020

(54) FOOD SUBSTANCE HEATING AND DISPENSING SYSTEM

(71) Applicant: StoreBound LLC, New York, NY (US)

(72) Inventors: Defang Chen, Shenzhen (CN); Xiqing Zhong, Luoding (CN); Yiyang Zhang, Shenzhen (CN); Yijun Wang, Guangdong (CN); Evan Marc Dash, New York, NY (US)

(73) Assignee: STOREBOUND LLC, New York, NY (US)

( * ) Notice: Subject to any disclaimer, the term of this patent is extended or adjusted under 35 U.S.C. 154(b) by 0 days.

(21) Appl. No.: 16/511,520

(22) Filed: Jul. 15, 2019

(65) Prior Publication Data
US 2019/0350391 A1 Nov. 21, 2019

Related U.S. Application Data

(63) Continuation of application No. 16/104,566, filed on Aug. 17, 2018, now Pat. No. 10,383,467.

(51) Int. Cl.
*A47G 19/26* (2006.01)
*B05B 9/00* (2006.01)
(Continued)

(52) U.S. Cl.
CPC ............ *A47G 19/26* (2013.01); *A47K 5/1215* (2013.01); *B05B 9/002* (2013.01); *B05B 9/005* (2013.01); *B05B 9/0872* (2013.01); *B67D 1/108* (2013.01)

(58) Field of Classification Search
CPC ........ A47G 19/26; B05B 9/002; B05B 9/005; B05B 9/0872; B67D 1/108; A47K 5/1215
See application file for complete search history.

(56) References Cited

U.S. PATENT DOCUMENTS

| 4,094,446 A | 6/1978 | Brutsman |
| 4,171,167 A | 10/1979 | Swartwout |

(Continued)

FOREIGN PATENT DOCUMENTS

EP 2524603 11/2012

OTHER PUBLICATIONS

A. Hitschrich and Dr. S. Kendrick, VolumeSpray—Operating Instructions, Krea Swiss AG: www.KreaSwiss.com, Distributed by JB Prince Company, Inc., Print date Jan. 9, 2018, pp. 1-24.

(Continued)

*Primary Examiner* — Frederick C Nicolas
(74) *Attorney, Agent, or Firm* — Belles Katz LLC

(57) ABSTRACT

A dispensing system for heating and dispensing a food substance in a liquid state includes a portable dispensing unit including housing including a reservoir for holding a food substance, a heater operable to heat the substance to an operating temperature for producing a liquid, and a pump for dispensing the liquid via a dispensing tube and spray nozzle. A manually activated actuator operates to initiate the dispensing cycle. Control circuitry associated with the dispensing unit monitors the liquid temperature and controls operation of pump and unit. The dispensing unit may be powered by a rechargeable battery. A charging base provides a dock for recharging the battery of the dispensing unit. The pump may include an auto-reverse feature to draw the liquid back into reservoir when not dispensing the liquid for preventing clogs in the dispensing system.

20 Claims, 19 Drawing Sheets

(51) Int. Cl.
*B67D 1/10* (2006.01)
*B05B 9/08* (2006.01)
*A47K 5/12* (2006.01)

(56) References Cited

U.S. PATENT DOCUMENTS

| | | | |
|---|---|---|---|
| 4,828,146 A | 5/1989 | Stein | |
| 4,919,308 A | 4/1990 | Majkrzak | |
| 5,117,079 A | 5/1992 | Morino et al. | |
| 5,421,663 A | 6/1995 | Bravo | |
| 5,955,114 A | 9/1999 | Llanos | |
| 7,918,370 B2 | 4/2011 | Yeh et al. | |
| 8,109,411 B2 * | 2/2012 | Yang | G01F 13/006 222/113 |
| 8,511,516 B2 * | 8/2013 | Klopfenstein | B67D 1/0031 222/190 |
| 8,870,029 B2 | 10/2014 | Stanojlovic et al. | |
| 10,383,467 B2 * | 8/2019 | Chen | |
| 2009/0020018 A1 | 1/2009 | Melzer | |
| 2010/0055309 A1 | 3/2010 | Frey | |
| 2014/0124540 A1 * | 5/2014 | Ciavarella | A47K 5/14 222/190 |
| 2016/0184848 A1 | 6/2016 | Foreman | |

OTHER PUBLICATIONS

A. Hitschrich and Dr. S. Kendrick, MultiSpray—Operating Instructions, Krea Swiss AG: www.KreaSwiss.com, Distributed by JB Prince Company, Inc., Print date Jan. 9, 2018, pp. 1-24.
Krea Swiss MultiSpray—Electric Food Spray Gun 60 Watta—LM25, Krea Siss AG (Shopping Website—Advertisement), Print date Nov. 2, 2018, pp. 1.
Biem Butter Sprayer—Quick Start Guide, Biem: www.biemspray.com, Print date Jan. 9, 2018, pp. 1-2.

* cited by examiner

FOOD SUBSTANCE HEATING AND DISPENSING SYSTEM

CROSS-REFERENCE TO RELATED APPLICATIONS

This application is a continuation of U.S. patent application Ser. No. 16/104,566 filed Aug. 17, 2018, which claims priority to Chinese Utility Model Application No. 2018920107183.0 filed Jan. 22, 2018; the foregoing applications being incorporated herein by reference in their entireties.

BACKGROUND

The present invention relates generally to apparatuses and processes for heating and dispensing a normally viscous or at least partially solid edible food substance.

Dairy products such as butter have many uses associated with the preparation of food. As some examples, butter may be used as a condiment to enhance flavor, as an additive incorporated into a cake batter for baking, or alternatively as a dairy-based source of fat, which can be used for frying. Various approaches have been used for heating and melting butter to convert this normally semi-solid/solid substance (i.e. at least partially solid) at typical ambient room temperatures (e.g. about 73 degrees F.) into a liquid state or condition amenable to many uses. It is desirable to use butter in liquid spray form in many applications.

Improved systems and processes which combine the functions of melting and dispensing a food substance such as butter are desired.

BRIEF SUMMARY

Embodiments according to the present disclosure provide a dispensing system and related processes or methods operable for storing, melting and dispensing an at least partially solid edible food product or substance in a liquid state. In various embodiments, the dispensing system may be configured to self-clean the dispensing tube, and/or heat the dispensing tube and associated dispensing nozzle to prevent the liquid from solidifying and clogging the dispensing flow path. In some embodiments, the system includes a control circuit configured such that the dispensing mechanism cannot be actuated to dispense the food substance until the circuit detects that the food substance has sufficiently melted and attained a liquid state of suitable temperature and viscosity amenable for pumping and spraying. This further reduces the likelihood of clogs or poor spray-ability and spray pattern due to the liquified food substance being more viscous than desired for optimal operation of the dispensing mechanism. In one embodiment, the dispensing mechanism may be configured to spray the food substance in the liquid state to produce a relatively fine mist. In addition, embodiments of the present dispensing system may be used for heating non-solid viscous food substances or fluids such as cooking oils to decrease their viscosity and improve spray-ability. Accordingly, the present apparatus is usable with either viscous or at least partially solid substances amenable to heating to decrease viscosity and/or change state from solid to liquid form as applicable.

The edible food substance usable with the present apparatus may be butter in some applications; however, other food products having similar characteristics to butter which are transformable from an at least partially solid state into a liquid state when heated may be used with the apparatus in addition to viscous fluids which are not at least partially solid at typical ambient room temperatures. Accordingly, the type of food substance used does not necessarily limit the applicability and use of the heating and dispensing system described herein.

In one aspect, a system for heating and dispensing a food substance in a liquid state includes a dispensing unit comprising: an elongated housing defining a longitudinal axis; a reservoir disposed in the housing and configured for receiving a food substance; an arcuately curved heating band complementary configured to the reservoir and in conformal contact with exterior side surfaces of the reservoir, the heating band operable to melt the food substance therein to produce a liquid; the heating band extending for substantially an entire height of the reservoir and wrapping around a circumference of the reservoir; a pump in fluid communication with the reservoir for pumping the liquid; a power supply; an actuator configured to selectively activate the pump; a dispensing nozzle supported by the housing; and a dispensing tube fluidly coupling the pump to dispensing nozzle; wherein activating the pump dispenses the liquid from the reservoir through the dispensing tube and nozzle.

In another aspect, a system for heating and dispensing a food substance in a liquid state includes: a housing defining a longitudinal axis; a reservoir disposed in the housing and configured for receiving a food substance; a heater in thermal contact with the reservoir and operable to melt the food substance therein to produce a liquid; a pump in fluid communication with the reservoir for pumping the liquid; a power supply; an actuator configured to selectively activate the pump, the actuator being alterable between an actuated and a deactuated state; a dispensing nozzle supported by the housing; a dispensing tube fluidly coupling the pump to the dispensing nozzle; a temperature sensor operable to measure a temperature of the liquid in the reservoir; and control circuitry operably coupled to the temperature sensor and pump; wherein placing the actuator in an actuated state activates the pump and dispenses the liquid from the reservoir through the dispensing tube and nozzle; wherein the control circuitry is configured such that the pump cannot be activated until the temperature reaches a preprogrammed minimum baseline operating temperature.

In another aspect, a method for heating and dispensing a food substance in a liquid state includes: providing a dispensing unit comprising a housing, a reservoir for receiving a food substance in at least partially solid form, a heating band, a pump fluidly coupled to the reservoir, and control circuitry operably coupled to the pump and heating band; inserting the food substance into the reservoir; heating the food substance with the heating band to produce a liquid; measuring a temperature of the liquid with a temperature sensor operably coupled to the control circuitry; depressing an actuator on the dispensing unit; activating the pump which rotates in a first direction; and the pump dispensing the liquid from the reservoir through a dispensing tube; wherein the control circuitry is configured to prevent activating the pump until the temperature reaches a minimum baseline operating temperature preprogrammed into the control circuitry.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
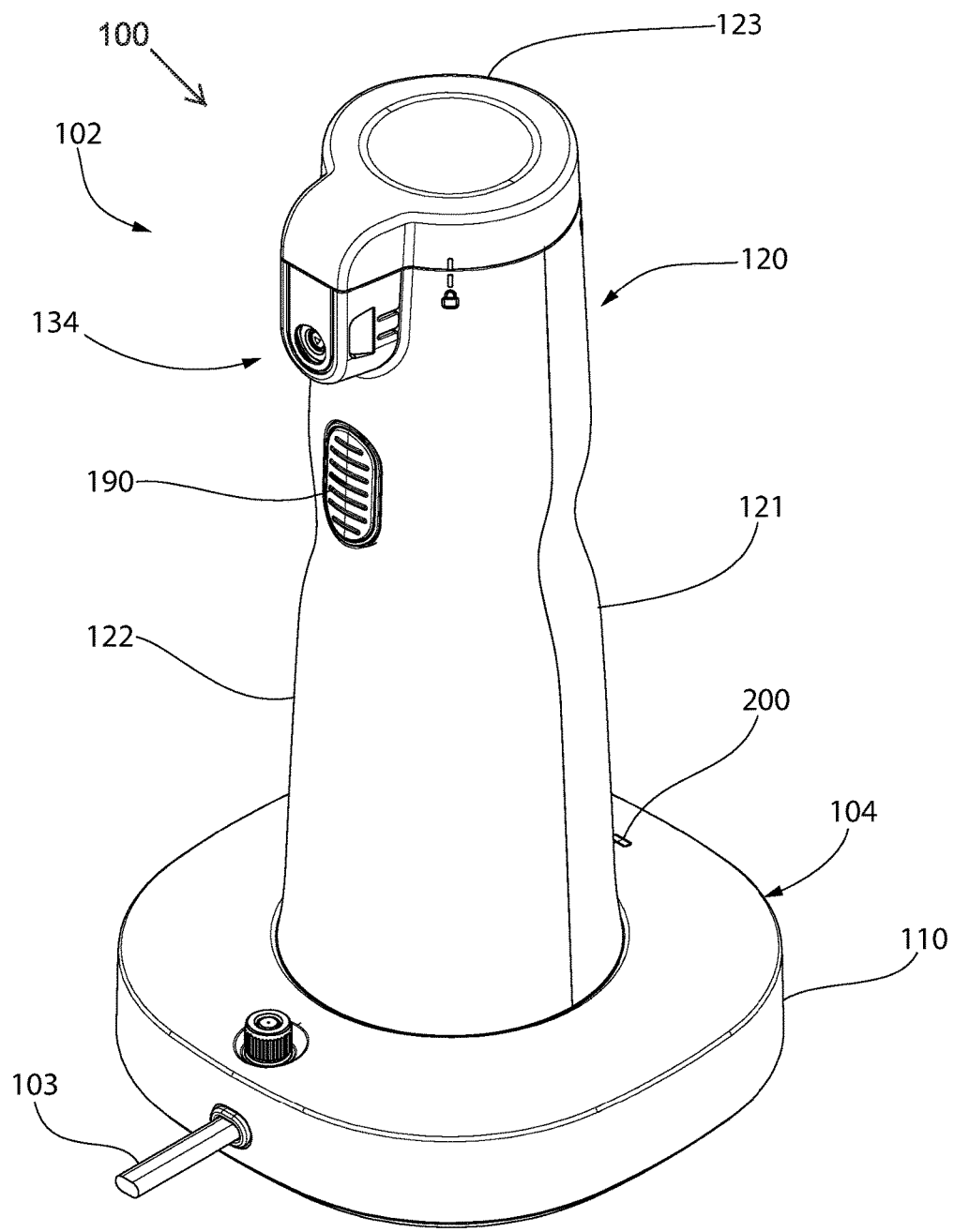
FIG. 1 is a perspective view of a system for heating and dispensing a liquefied food substance according to the present disclosure including a dispensing unit and a charging base.
Figure 2:
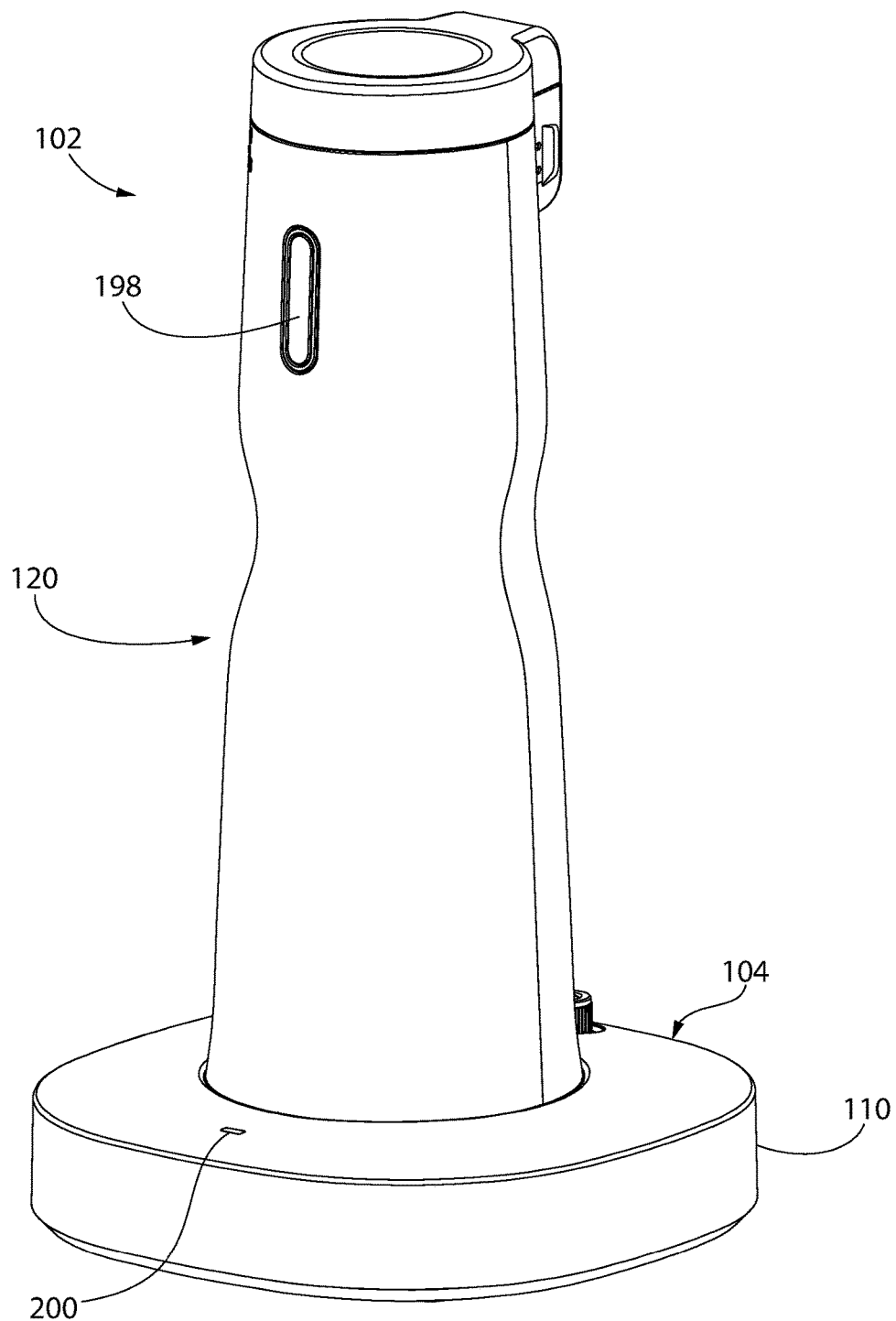
FIG. 2 is a rear perspective view thereof.
Figure 3:
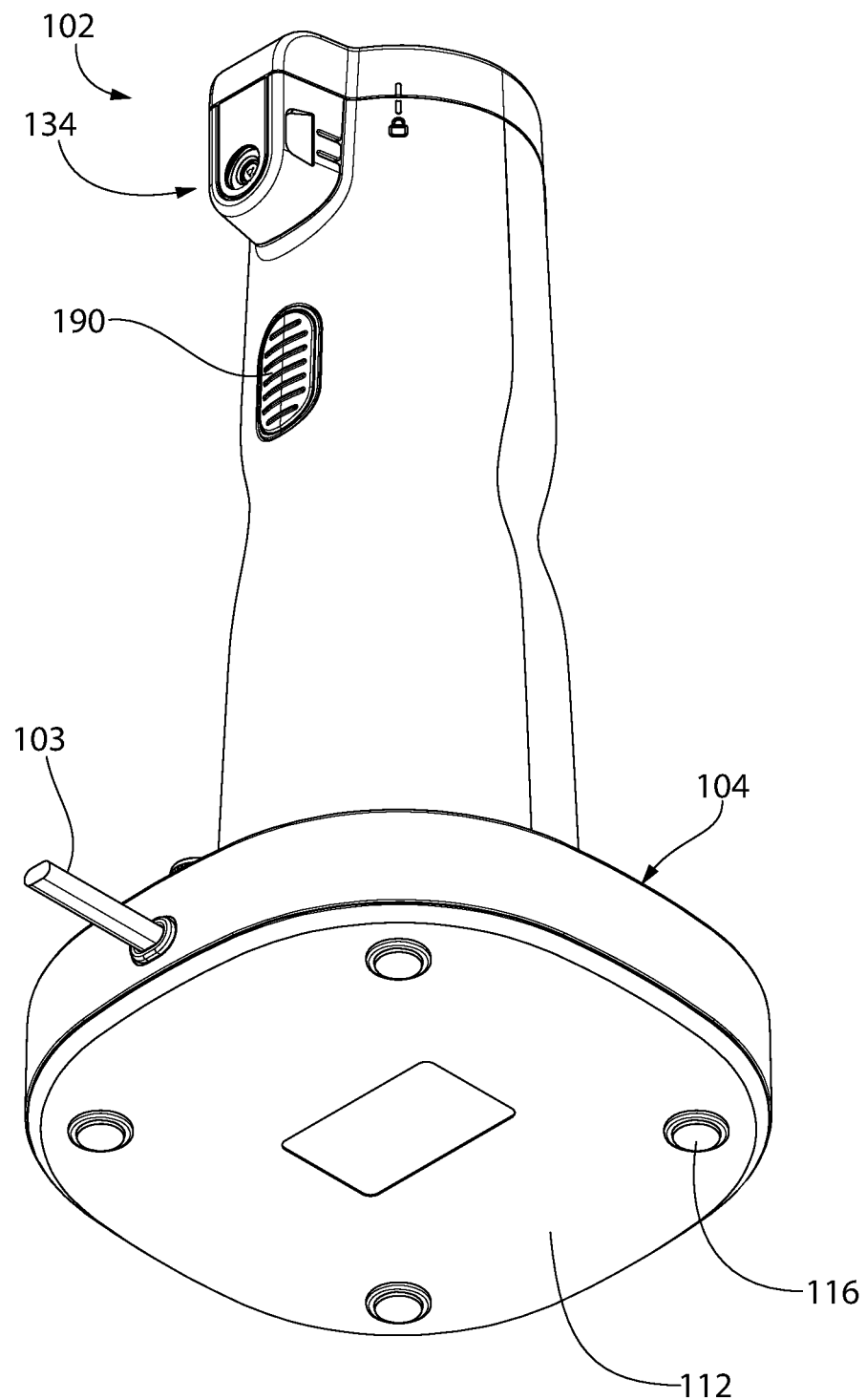
FIG. 3 is a bottom perspective view thereof.
Figure 4:
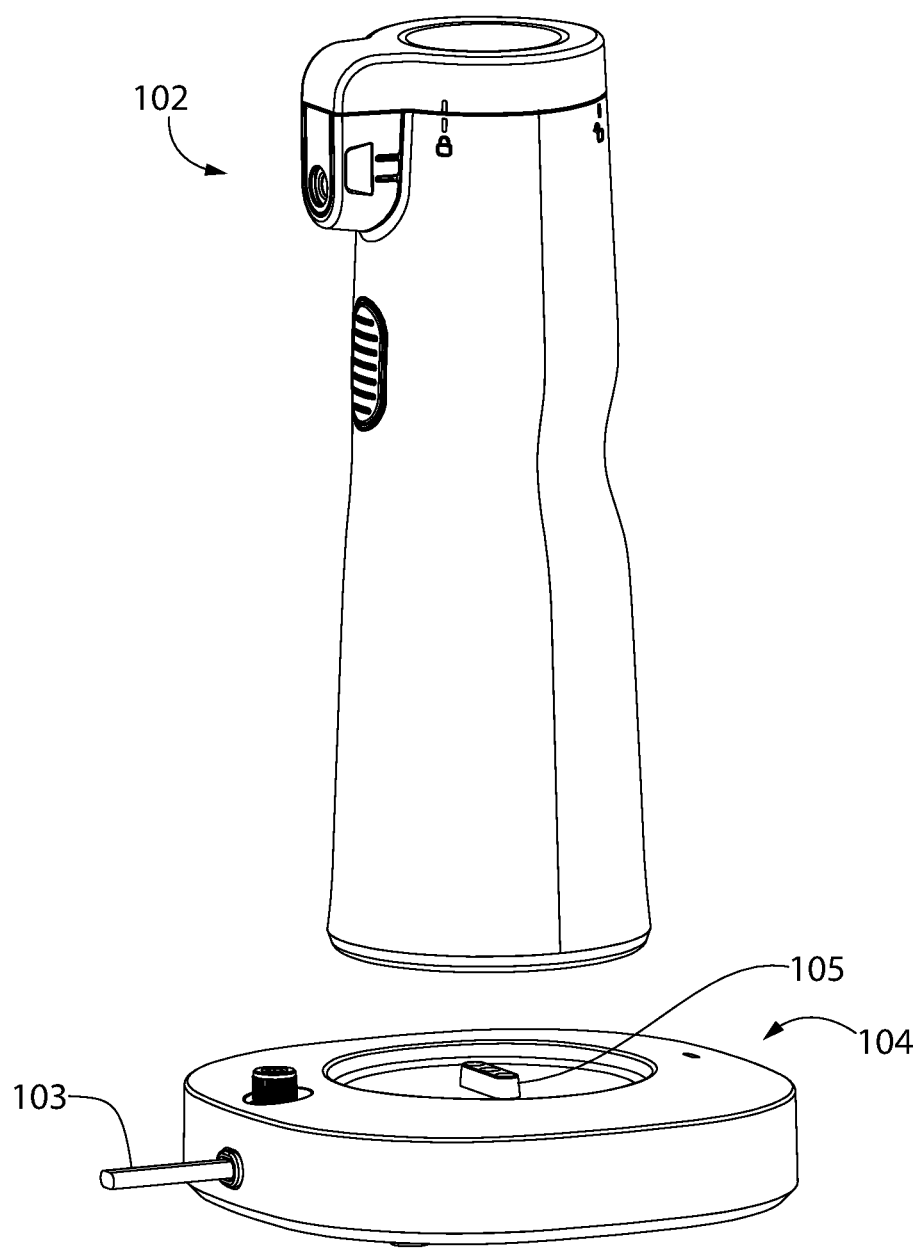
FIG. 4 is an exploded perspective view thereof.

All drawings are schematic and not necessarily to scale.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

FIGS. 1-21 depict a dispensing system configured and operable for storing, heating, and dispensing a liquefied food substance according to the present disclosure. The dispensing system 100 in one non-limiting embodiment may generally include an assembly of a rechargeable dispensing unit 102 and charging base 104.

Figure 11:
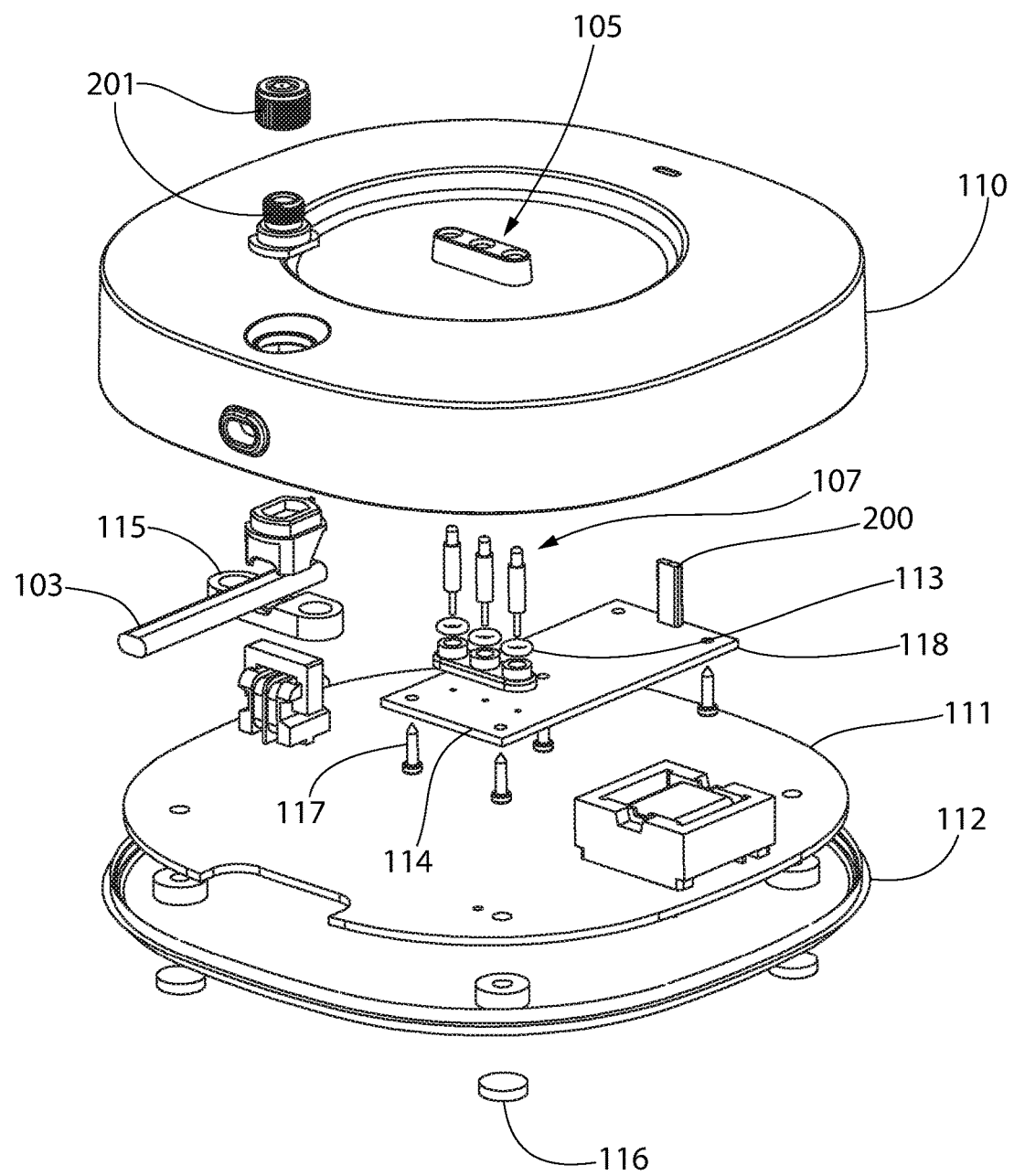
FIG. 11 is an exploded perspective view of the charging base.
Figure 12:
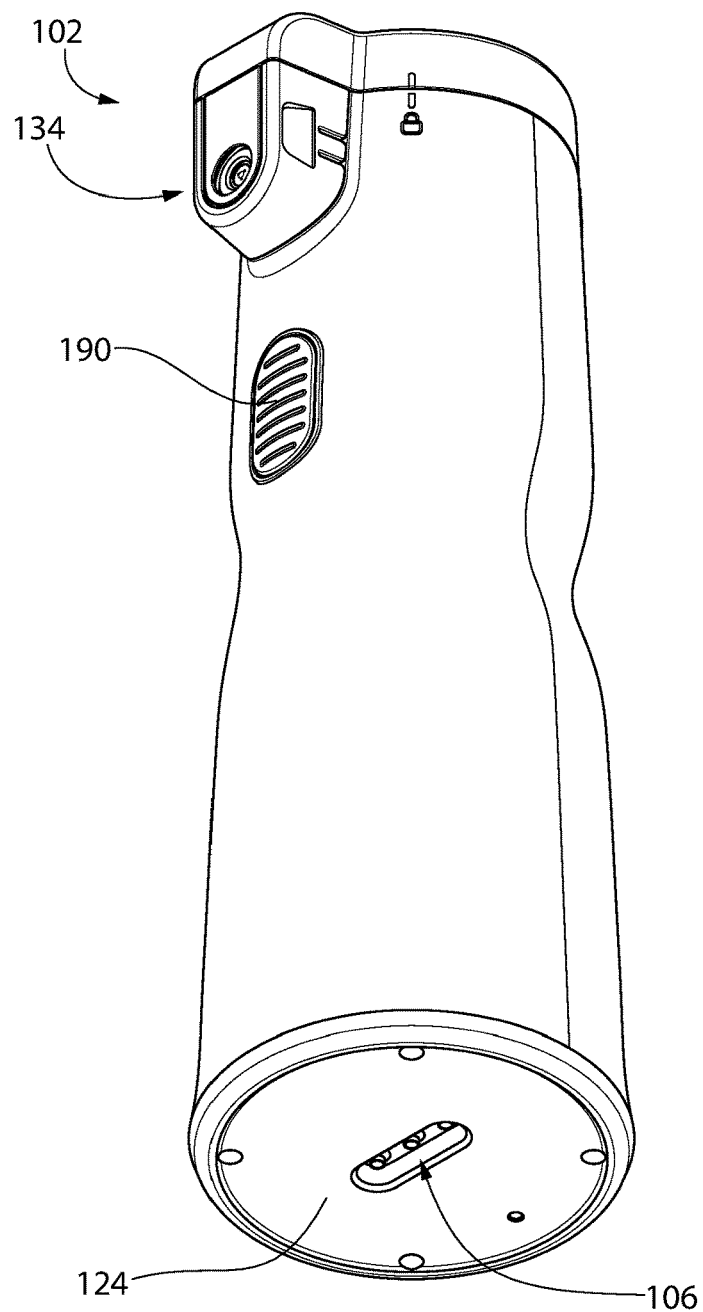
FIG. 12 is a bottom perspective view of the dispensing unit alone showing the electrical connector for connection with the electrical connector of the charging base seen in FIG. 11.
Figure 13:
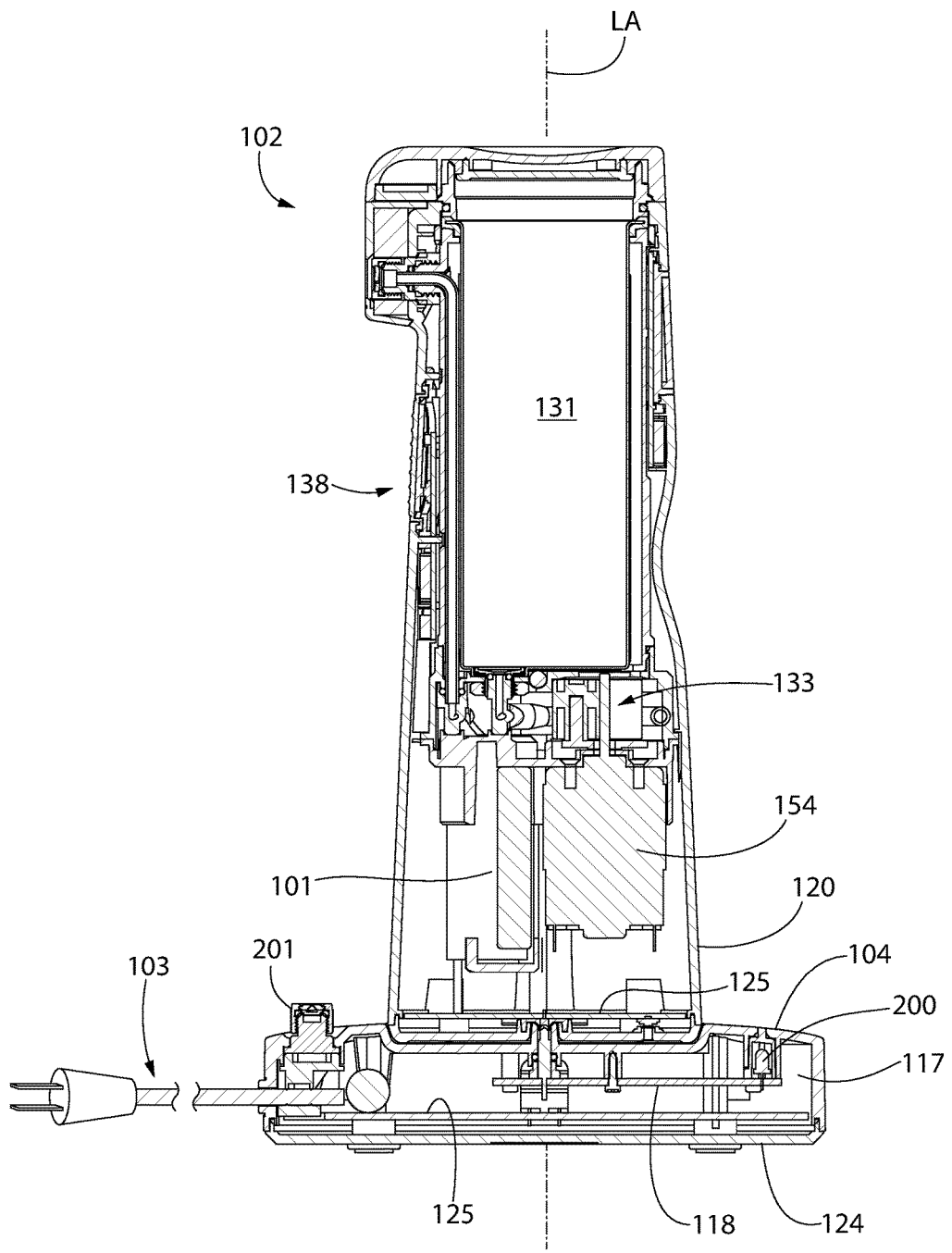
FIG. 13 is a longitudinal cross-sectional view of the dispensing unit.
Figure 14:
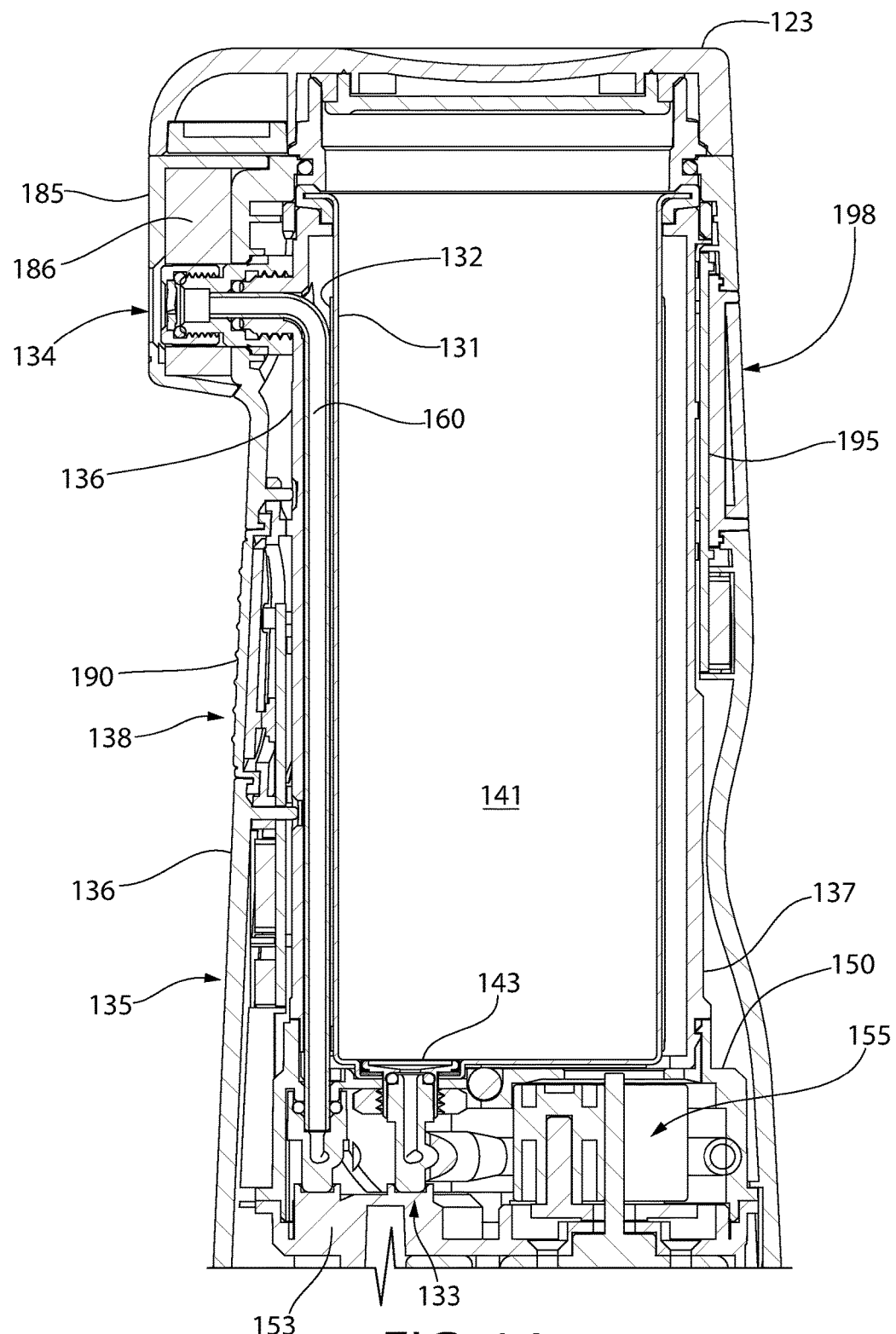
FIG. 14 is a first enlarged view thereof showing the upper portion in detail.
Figure 15:
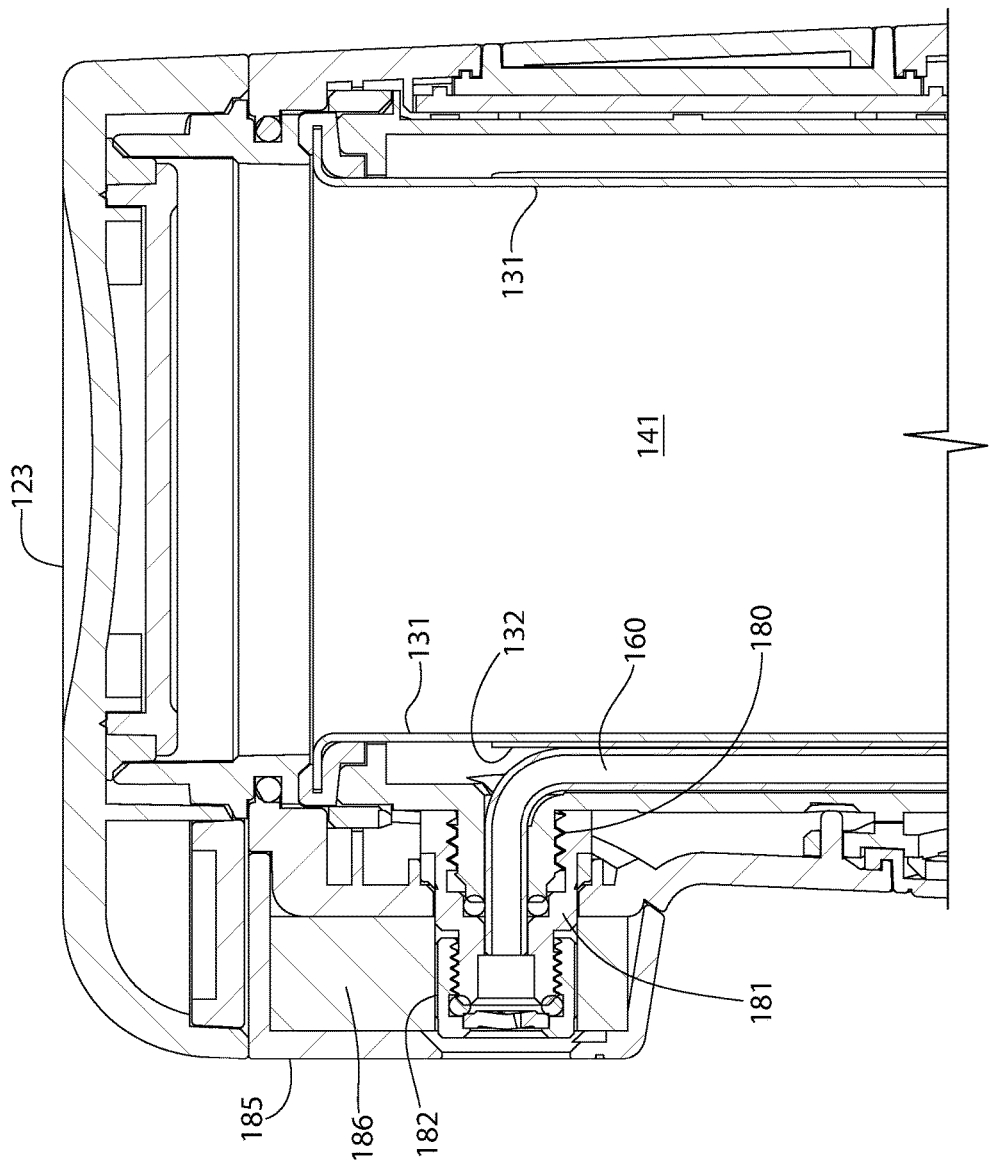
FIG. 15 is a second enlarged view thereof showing the dispensing portion in detail.

FIG. 11 is an exploded view of charging base 104 and FIG. 13 includes a cross-sectional view thereof. Base 104 may include in order an upper base cover 110 and lower base cover 112 which define an internal base cavity 117. A power board 111 comprising electronic circuitry is disposed in cavity 117 which is conductively connected to a power cable 103 that provides power to the base for controlling the power supply and recharging the dispensing unit 102. A power cable trim strip 115 secures the power cable to the power board 111 such as via threaded fasteners 117. A pin board 118 operably and electrically connected to the power board 111 in one non-limiting embodiment supports an elongated pin cushion 114 and pin sealing rings 113; both of which receive and support a plurality of metal contacts which may be in the form of vertically elongated conductive pins 107. Pins 107 are received in an electrical terminal connector 105 which mates with contacts or pins of a complementary configured connector 106 on the bottom of dispensing unit 102 to transfer power from the base 104 to the control board 125 in the dispensing unit. Control board 125 includes a power distribution circuit electrically connected to the rechargeable battery 101, pump motor 154, heating band 131, status lights 198, and other components on the dispensing unit 102 under the control of the control circuitry 126 integrated into the control board, as further described herein. Other types, arrangements, and/or shapes of electrically conductive contacts and connectors may be used and does not limit the invention. The electrical power cable 103 includes a standard two or three-prong end plug which can be plugged into a standard electrical outlet as typically found in a building structure. A charging base indicator light 200 which may be an LED (light emitting diode) is mounted on pin board 118 to provide the operational status of the base (e.g. power on, dispensing unit 102 charging, etc.). An on/off switch 201 may be provided to power the unit on or off. The base upper and lower covers 110 and 112 may be formed of any suitable non-metallic (e.g. plastic) or metallic materials.

Dispensing unit 102 may be removably and electrically coupled to the base 104 for recharging the dispenser battery 101 via electrical connectors 105, 106. Battery 101 may be a rechargeable lithium battery 101 in one example for operating the dispensing unit 102. Other types of suitable batteries for this application however may be used.

Referring generally again to FIGS. 1-18 at first, dispensing unit 102 generally includes a main outer housing 120, a removable top cap or cover 123, and bottom cover 124. Outer housing 120 in one construction may include a front housing 121 and rear housing 122 attachable to the front housing. Housing 120 may be vertically elongated and generally cylindrical in one configuration. Housing 120 defines a vertical longitudinal axis LA (reference made to dispensing unit in the upright position).

A control board 125 which may be printed circuit board (PCB) is disposed in housing 120 of dispensing unit 102. Control board 125 may be of circular shape (shown), or another shape such as without limitation rectilinear or polygonal. In one arrangement, control board 125 may be positioned adjacent bottom cover 123.

Control board 125 includes control circuitry 126 which controls operation of the dispensing unit 102 for generally heating and dispensing the food substance, and control charging of the rechargeable dispensing unit 102. The control circuitry 126 comprises a programmable microcontroller (MCU) 126a (schematically depicted in FIG. 5) operable to execute program instructions or code (e.g. control logic or software). The microcontroller 126a includes one or more processors (CPUs/MPUs), non-transitory tangible computer readable medium 126b, and programmable input/output peripherals. Computer readable medium 126b may include volatile memory and non-volatile memory operably and communicably coupled to the processor(s). Any suitable combination and types of volatile or non-volatile memory may be used including as examples, without limitation, random access memory (RAM) and various types thereof, read-only memory (ROM) and various types thereof, flash memory, or other memory which may be written to and/or read by the processor operably connected to the medium. Both the volatile memory and the non-volatile memory may be used for storing the program instructions or software. In some embodiments, the control circuitry 126 may be a system on a chip (SOC) or an application-specific integrated circuit (ASIC) comprising a microchip; either of which may be designed and configured to control the dispensing unit 102 in accordance with the functions described herein.

The control circuitry 126 may further include an input/output communication interface or module configured for wireless and/or wired communication for programming the processor and exchanging data with the control circuitry 126. Wireless communication protocols used may include Bluetooth, NFC (near field communication), WiFi, or others. The control circuitry 126 may include all the usual ancillary components necessary to form a functional data processing and control device. It is well within the ambit of one skilled in the art to provide and configure the control circuitry with all the required appurtenances to provide a fully function control system for operating the dispensing unit 126 in the manner disclosed herein. It will be appreciated that various aspects of the dispensing unit control and functionality may be embodied in software, firmware, or hardware.

Dispensing unit 102 further includes an internal assembly comprising a spray apparatus 130 which is configured and functions to store, heat, melt, and dispense the food substance in liquid form. Referring particularly to FIGS. 13-21, spray apparatus 130 generally includes a liner or reservoir 131, a heater such as a flexible heating panel or band 132, a pump 133, dispensing nozzle assembly 134, actuator assembly 138, and cover 135. Cover 135 may include a front cover 136 and rear cover 137 attachable to the front cover. The covers 136 and 137 may each be semi-circular in transverse cross section and formed as mating half-cylinders in one configuration. Covers 136, 137 may extend for a majority of, and more particularly in the illustrated embodiment, substantially the entire height of the reservoir 131.

Figure 5:
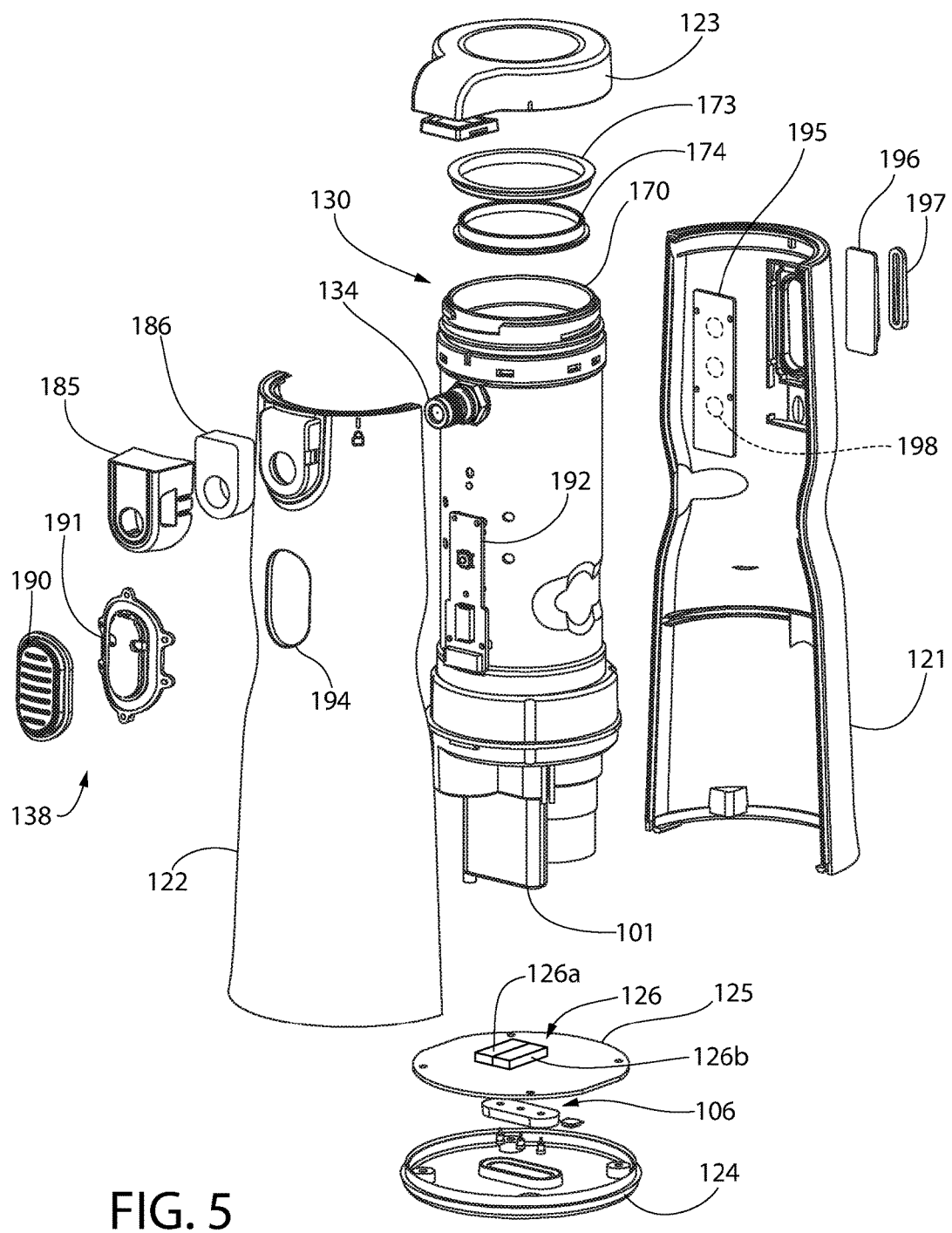
FIG. 5 is an exploded perspective view of the dispensing unit alone.
Figure 7:
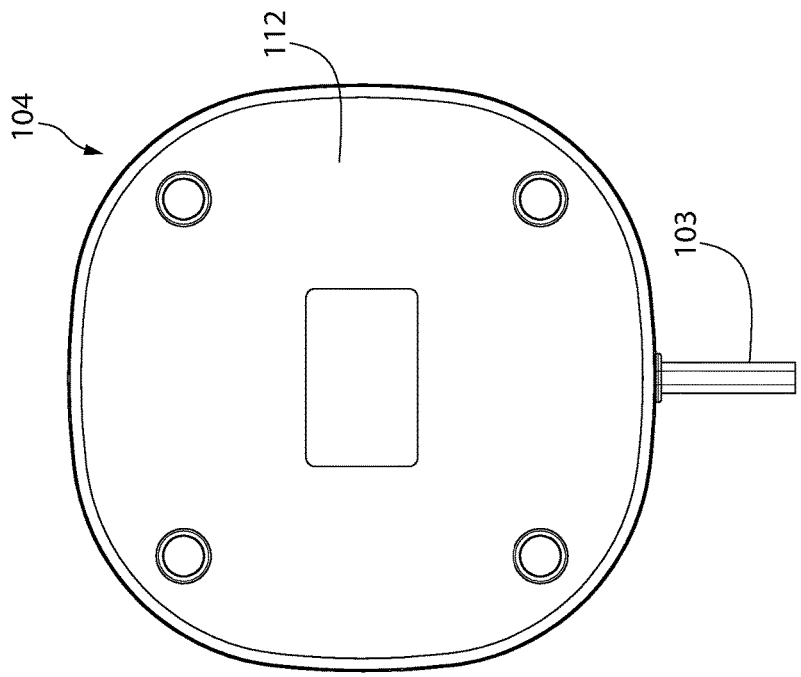
FIG. 7 is a bottom view thereof.
Figure 6:
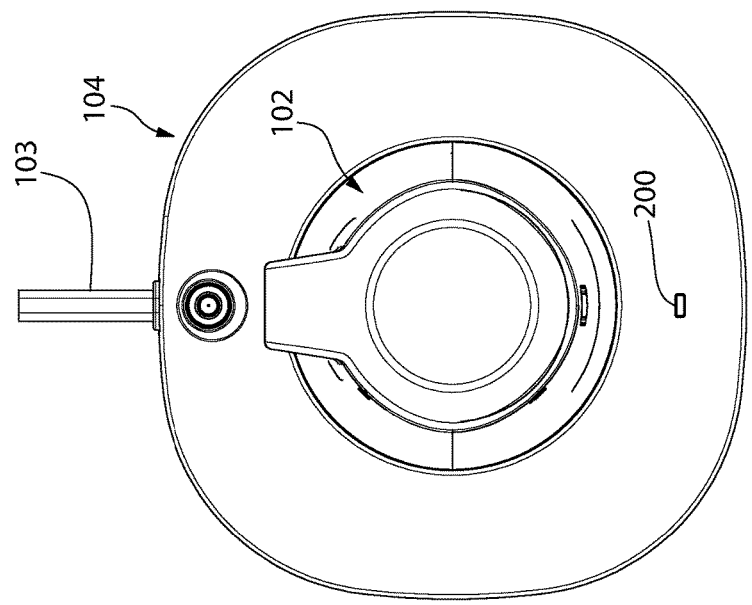
FIG. 6 is a top view of the system of FIG. 1.
Figure 8:
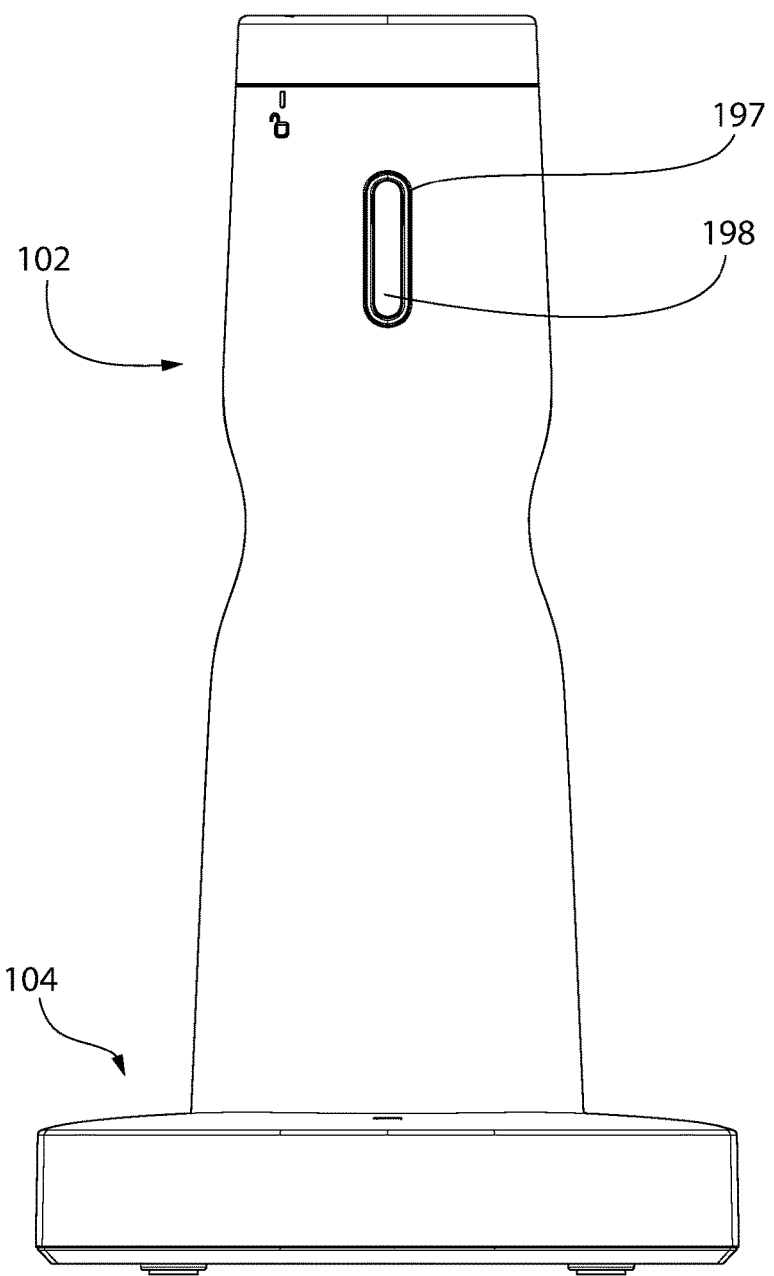
FIG. 8 is a rear elevation view thereof.
Figure 9:
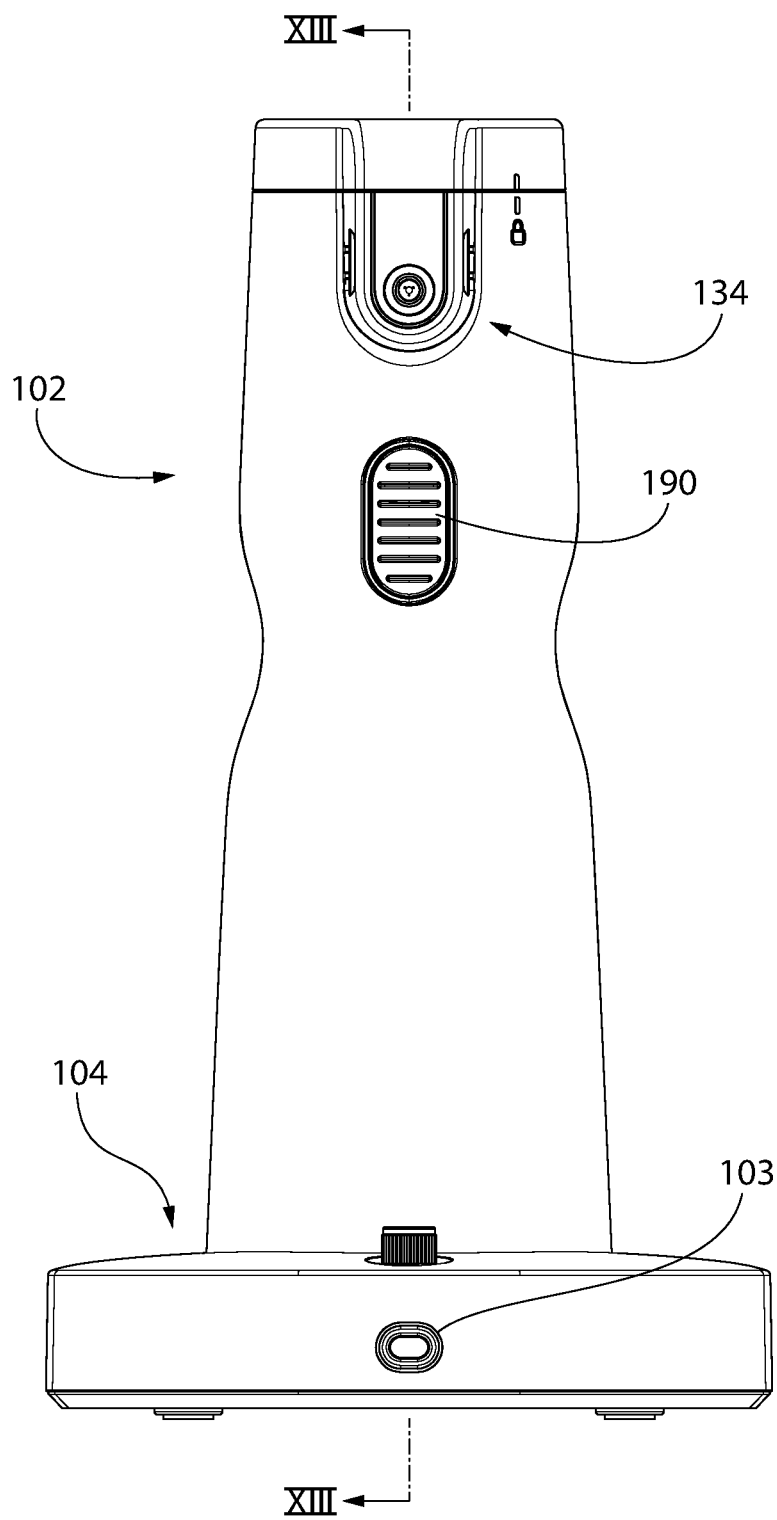
FIG. 9 is a front elevation view thereof.
Figure 10:
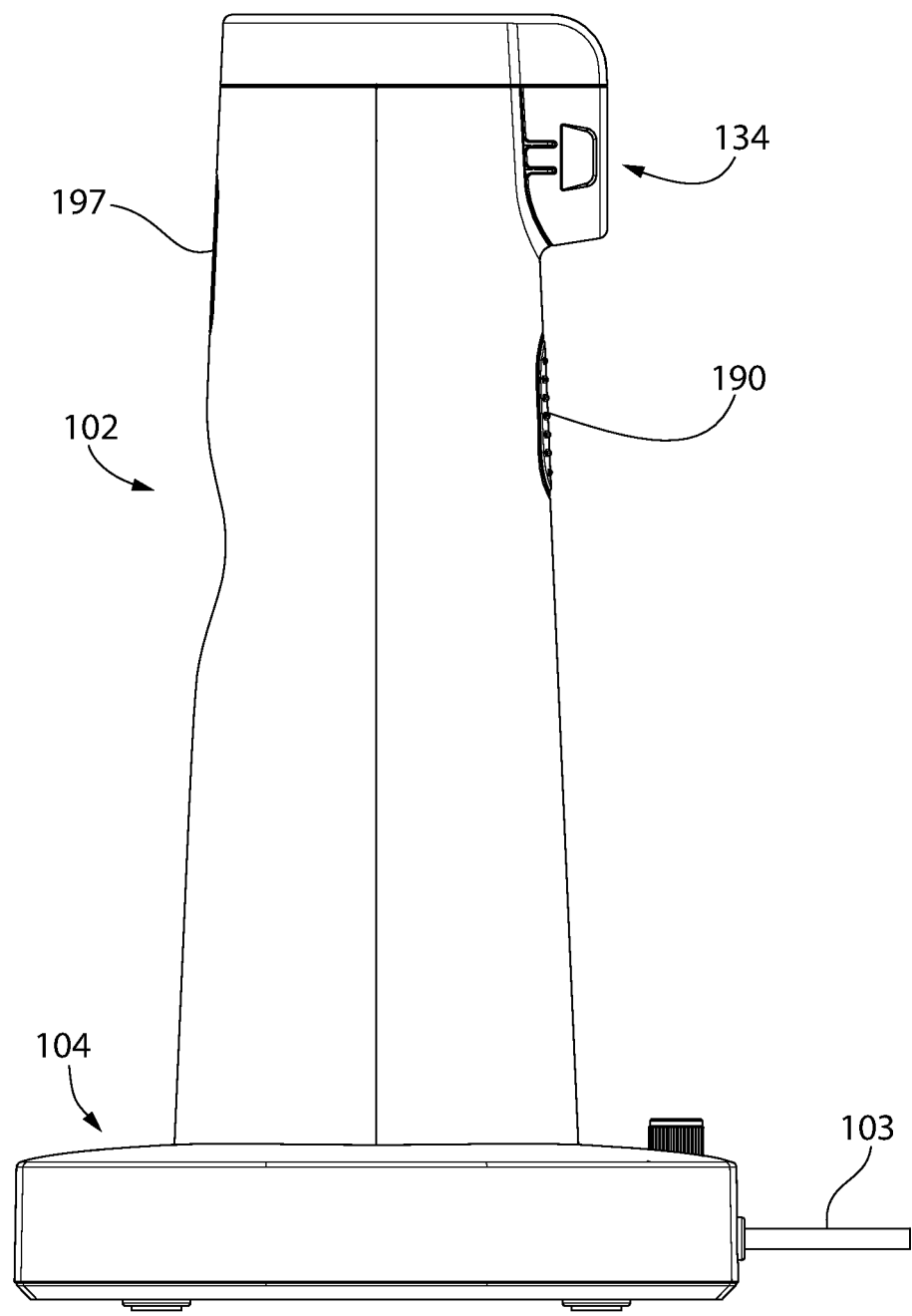
FIG. 10 is a right side elevation view thereof.
Figure 16:
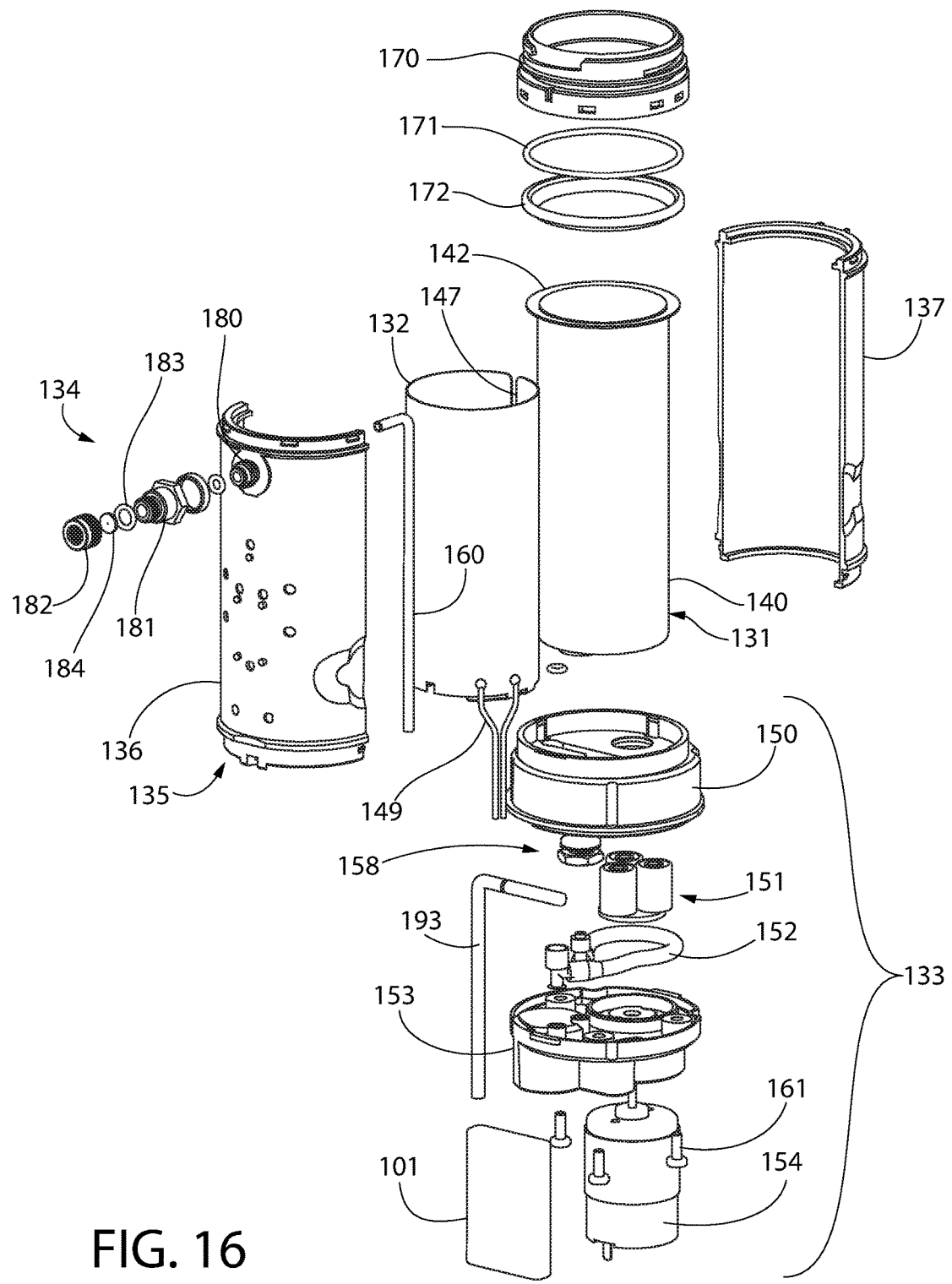
FIG. 16 is an exploded top perspective view of the dispensing unit.
Figure 17:
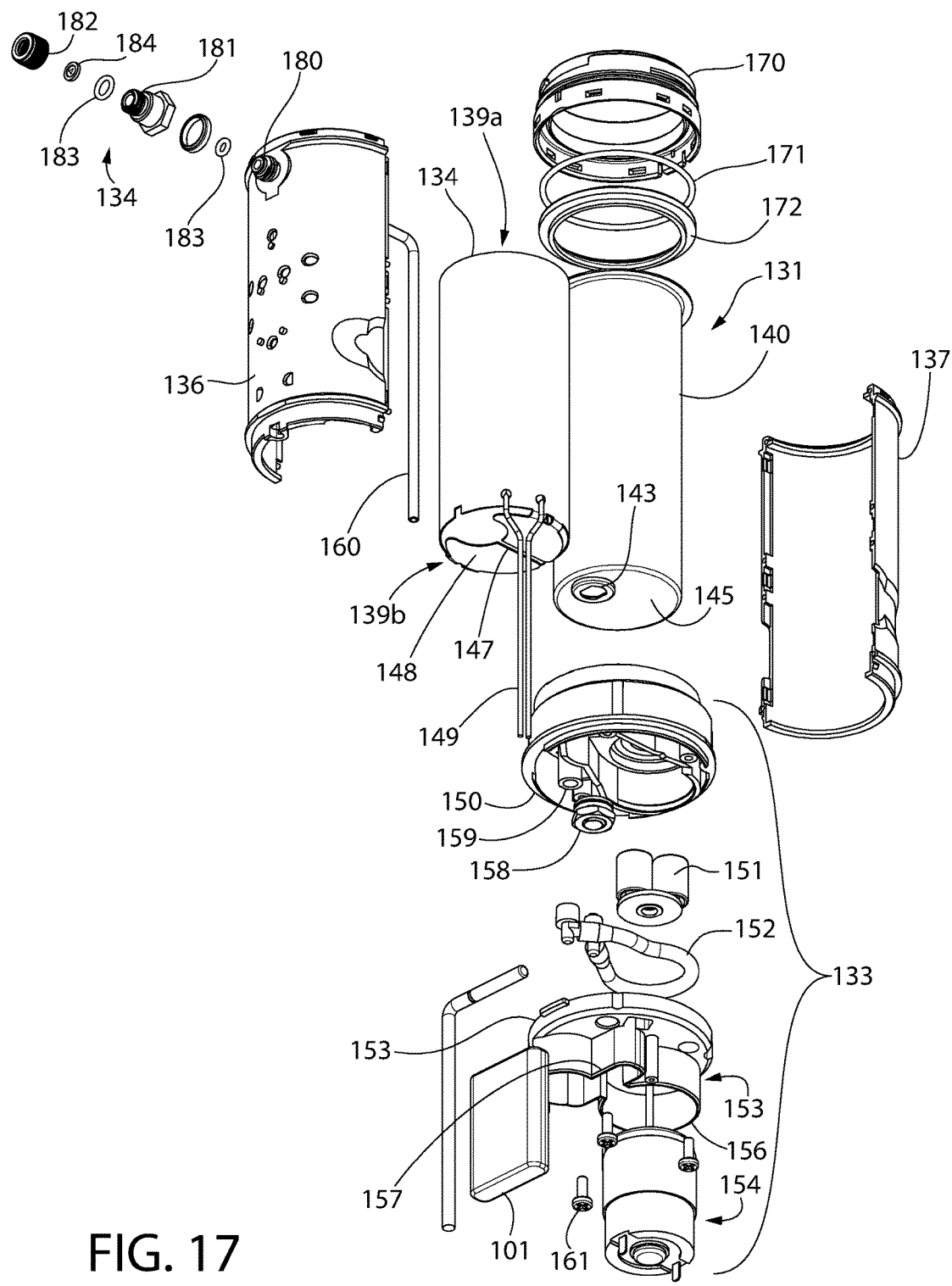
FIG. 17 is an exploded bottom perspective view thereof.

To removably and sealably attach the top cover 123 of dispensing unit 102 to the cover 137 of the spray apparatus 130, a threaded bottle ring 170 may be disposed on the top end of the cover as shown in FIGS. 5 and 16-17. The inside of the top cover 123 comprises complementary configured threads. The threads on the bottle ring and top cover may be mutually configured for ¼ turn opening/closing operation of the top cover in one embodiment. Bottle ring 170 is sealed to the spray apparatus cover 137 by a combination of a bottle seal ring 171 and reservoir seal ring 172, thereby forming a leak-resistant coupling. The top cover 123 of the dispensing unit is in turn fluidly sealed to bottle ring 170 via a seal, which may comprise an assembly of cooperating first and second annular seals 173 and 174 in one embodiment. Other methods of attaching and sealing the top cover 123 to the top end of spray apparatus 130 may be used.

Reservoir 131 includes an internal cavity 141 configured for holding and storing the food substance FS, which in one non-limiting example may be butter. In one embodiment, reservoir 131 may be formed by a vertically elongated cylindrical shell 140 including an open top 142 for inserting the food substance, and a substantially closed bottom 145 except for an outlet opening 143 fluidly coupled to the pump suction coupling 146. In one embodiment, reservoir 131 may be formed a metal such as without limitation aluminum, stainless steel, or other suitable for being heated by heating band 134.

In one embodiment, reservoir 131 may be configured and dimensioned to provide a volumetric capacity capable of holding at least one standard stick of butter. A standard U.S. stick of butter weighs approximately 4 ounces and has a rectangular cuboid shape measuring approximately 3.25 inches long×1.5 inches high×1.5 inches wide. The reservoir has a commensurate height and diameter to at least accommodate these dimensions, and in some embodiments has a height and diameter close to these dimensions (but slightly larger of course) to minimize the overall height and diameter of the dispensing unit making it compact and comfortable for the user to grip.

Heating band 134 is operable to heat and melt the food substance FS in reservoir 13 to produce a liquid. Heating band 134 may be configured and arranged to engage the cylindrical exterior side surface of reservoir 131 and is disposed between the cover 135 and reservoir. In one embodiment, heating band 134 in particular may be arcuately curved and in conformal contact with a majority of, and preferably substantially the entirety of the exterior side surfaces of the reservoir 131 for effective and efficient heating thereof. Heating band 134 is complementary configured to the reservoir and shares a similar vertically elongated cylindrical shape as shown. The heating band 134 may extend for substantially the entire height of the reservoir 131 and wraps around a majority, and preferably the substantial entirety of a circumference of the reservoir. Heating band 134 has a monolithic solid structure extending between a top end 139a and a bottom end 139b of the heating band.

Heating band 134 is formed of a resiliently deformable material providing a structure having an elastic memory. To increase flexibility of the heating band 134, a linear slit 147 formed in the body of the heating band extends vertically between the top and bottom ends 139a, 139b of heating band for the entire height of the band forming a vertical part of the slit. The heating band 134 may include a horizontal bottom portion 148 which partially closes the bottom end 139b of the band (best seen in FIG. 17). The slit 147 continues horizontally across and through this bottom portion 148 forming a horizontal part of slit which is contiguous with the vertical part of the slit.

Heating band 134 is changeable between an undeformed contracted state and a deformed expanded state when positioned on and around the reservoir 131. The heating band 134 may have an undeformed diameter slightly smaller than the reservoir. To install the heating band 134 which is initially in the undeformed contracted state prior to mounting on the reservoir, the band is slid onto the reservoir 131 from its bottom end. Due to the differences in diameters between the band and reservoir, the heating band will expand and deform circumferentially via the slit 147 when the band slideably engages the cylindrical side surfaces of the reservoir 131. The elastic memory of the heating band 134 creates a clamping action on the reservoir 131 causing the heating band to frictionally engage the reservoir. This creates a conform contact between the heating band and reservoir with no substantial interstitial spaces present between the band and reservoir for optimum heating efficiency. The heating band 134 will remain in this deformed expanded state while position on reservoir 131.

Heating band 134 may be formed of a sufficiently thin metal plate which is bent or otherwise formed to a cylindrical shape. Examples of materials which may be used include electrically conductive metals possessing an elastic memory to produce the resiliently deformable structure, such as without limitation copper, aluminum, steel, or other. A pair of electrically conductive leads 149 electrically couples the heating band 134 to the power source (e.g. battery 101). In one embodiment, the heating band 134 may be coupled to the power source through the control circuitry 126 which may be configured to control the heating of the food substance.

Pump 133 may be a positive displacement type pump. In one embodiment, a peristaltic pump as illustrated may be used which are well known in the art and commercially-available. Peristaltic pumps generally comprise a flexible flow tube disposed inside the pump casing which is acted upon by a rotating roller assembly that alternatingly compresses and relaxes the tube to create negative pressure (vacuum) and positive pressure inside the flow tube. This draws or suctions liquid from a reservoir into the pump under negative pressure, and discharges or displaces the liquid under positive pressure to the delivery site.

With reference to FIGS. 13-21, pump 133 generally includes a pump housing comprising an upper cover 150 and lower foundation 153, roller assembly 151, U-shaped flexible/resilient flow tube 152, and electric motor 154. Cover 150 and foundation 153 are attached together such as via fasteners 161 or other means (e.g. snap fit, interlocking tabs/slots, etc.), and collectively define an internal chamber 155 for housing the roller assembly and flow tube therein. The cover 150 and foundation 153 may each be considered generally disk-like and cylindrical in shape. The upper cover 150 attaches to the bottom end of the spray apparatus cover 135 and supports the reservoir 131 which projects upwardly therefrom.

The deformable resilient flow tube 152 remains stationary during operation of the pump and is fixedly mounted between the pump upper cover 150 and lower foundation 153. The roller assembly 152 is mounted on the spindle of the motor 154 and rotated by the motor. Roller assembly 152 may comprise a plurality of rollers 151 (e.g. 3 rollers in this non-limiting example) which engage and alternatingly compress and relax/release the flow tube in typical fashion as the rollers rotate to pump the liquefied butter from the reservoir 131. The rollers 151 act to compress sections of the tube 152 against an arcuately curved compression wall 162 formed on the underside of the pump upper cover 150 (see, e.g. FIG. 21). The clearance between the rollers 151 and wall 162 therefore is less than the diameter of the flow tube 152. This squeezes and deforms the flow tube 152 to pump the liquid from the reservoir 131. The vertical centerline CL1 of the pump defined by the spindle of the motor 154 defines a rotational axis, which in some embodiments as illustrated may be laterally offset from longitudinal axis LA of the dispensing unit 102.

Flow tube 152 includes a suction coupling 146 on one end and a discharge coupling 144 on the opposite end. Suction coupling 146 is fluidly coupled to the reservoir 131 (i.e. cavity 141) via a suction nozzle assembly 158 on pump upper cover 150. The nozzle assembly 158 may include a filter 163 to filter the liquid in addition to seals and fittings necessary to establish a leak-resistant fluid coupling between tube suction coupling 146 and reservoir 131 via outlet opening 143 at the bottom of the reservoir. Filter 163 may comprise a porous filter media or may include one or more holes of predetermined diameters to block larger unmelted portions of the food substance or congealed butter fat in reservoir 131 from entering the pump suction. Cover 150 includes an inlet opening 164 establishing a flow passageway between the reservoir and pump inlet nozzle assembly 158. Discharge coupling 144 is fluidly coupled to a pump dispensing tube 160 via a discharge nozzle 159 on pump upper cover 150 for dispensing the liquefied food substance from the pump 133.

Motor 154 may be mounted beneath the lower foundation 153 of pump 133. Foundation 153 may include a downward open motor chamber 156 configured for receiving the motor 154 at least partially therein. In a similar vane, the foundation may also define a downwardly open battery chamber 157 for receiving the upper portion of the battery 101 at least partially therein. Each of the chambers 156 and 157 are complementary configured to the motor 154 and battery 101, respectively, to securely position the motor and batter within the spray apparatus 130.

Both the pump upper cover 150 and lower foundation 153 may include one or more other openings for forming electrical or control wiring connections to the power supply (battery 101) and control board 125 in the dispensing unit 102.

Pump dispensing tube 160 fluidly couples the pump discharge to the dispensing nozzle assembly 134. Tube 160 has a first end fluidly coupled to flow tube discharge coupling 144 and a second end fluidly coupled to the nozzle assembly 134. Dispensing tube 160 may be L-shaped in one embodiment and may have a substantially rigid structure as illustrated. The dispensing tube may thus include a long vertical section arranged parallel to longitudinal axis LA and a shorter horizontal section oriented perpendicularly to the vertical section and longitudinal axis.

In one embodiment, the dispensing nozzle assembly 134 may comprise an inner nozzle 181 and an outer spray nozzle 182. Inner nozzle 181 is threadably coupled to a threaded boss 180 formed on the front cover 136 of spray apparatus 130 through which the shorter horizontal section of dispensing tube 160 projects from the cover. Outer spray nozzle 182 is configured to produce a spray pattern and is threadably coupled to the inner nozzle. One or more annular seals 183 which may be O-rings may be provided in the nozzle assembly 134 to form a leak-resistant fluid seal. The nozzle assembly 134 may include an orifice plate 184 to regulate the flow of the liquid food substance through the nozzle. In one embodiment, nozzle assembly 134 may be disposed proximate to the top of the dispensing unit 102 near top cover 123. The nozzle assembly 134 may include a nozzle cover 185 and nozzle sponge 186 interposed between the cover 185 and front cover 136. Other arrangements and configurations of the dispensing nozzle assembly may be provided.

In one embodiment, the pump dispensing tube 160 is preferably formed of a heat resistant metallic or non-metallic material (e.g. silicon, copper, stainless steel, etc.) capable of direct engagement with the heating band 134 for heating the tube. Tube 160 is interspersed between the front cover 136 of spray apparatus 130 and heating band 134. In one particular embodiment, dispensing tube 160 may be arranged to abuttingly contact heating band 134 for a majority of the vertical length or height of the tube to be heated. This heating advantageously ensures that the liquid food substance is maintained in fluid form and does not solidify either when spraying or in between intermittent spraying operations to prevent clogging the dispensing tube. In one arrangement, the top end 139a of heating band 134 terminates at a point at least equal to or higher than the horizontal section of the dispensing tube 160 (see, e.g. FIGS. 13-15). In one embodiment, the inner nozzle 181, outer spray nozzle 182, and threaded boss 180 of the dispensing nozzle assembly 134 may further preferably be formed of a suitable metal as well to be conductively heated by the dispensing tube 160 for the same purposes. This ensures that the food substance remains completely melted and in a liquid state suitable for spraying in the entire dispensing system.

Referring generally to FIGS. 1-14, actuator assembly 138 includes a depressible actuator button 190, button holder 191 mounted on front cover 136 of spray apparatus 130, and an actuator circuit board 192 also mounted on the front cover. Button holder 191 movably supports the actuator button 190. The actuator circuit board 192 may be operably and communicably coupled to the main control board 125 and control circuitry 126 via communication passageways which may comprises wired connections in one embodiment. The actuator circuit board 192 may include an electronic or mechanical switch configured and operable to detect depression of the actuator button 190 by a user dispense and spray the liquid food substance from reservoir 131. Detection of a depressed actuator button 190 transmits a control signal to control circuitry 126 to actuate the pump 133 and initiate the dispensing/spraying action.

In one embodiment, the actuator button 190 may be positioned on the front housing 122 of dispensing unit 102 below the dispensing nozzle assembly 134. The button 190 may protrude from beneath the front housing through an access opening 194 of suitable size and shape (see, e.g. FIG. 5). Other arrangements and configurations of the actuator assembly 138 are possible.

A control interlock may optionally be provided to prevent dispensing the food substance until the at least partially solid substance (e.g. butter) is fully melted and ready for dispensing (i.e. in liquid form). This advantageously prevents or minimizes chances for clogging the dispensing tube 160 or dispensing nozzle assembly 134 with partially solidified or highly viscous food substance. In one embodiment, a temperature sensor 193 may be provided which is configured and arranged to measure the real-time actual temperature of the food substance (e.g. butter) inside the reservoir 131. This may be achieved in one implementation by detecting the temperature of the inner wall of reservoir 131 with the sensing portion or head of the temperature sensor 193 based on the principle that the electrical resistance of a material changes with a corresponding change in temperature. FIG. 5 schematically depicts temperature sensor 193 as an L-shaped object (which is not to be literally interpreted as such). Any suitable resistance measuring type temperature sensor may be used, such as for example without limitation a thermistor, thermocouple, RTD (resistance temperature detector), or other type temperature sensor. Temperature sensor 193 is operably and communicably coupled to the control circuitry 126 (e.g. via a wired connection leads).

Control circuitry 126 (e.g. microprocessor 126a) in one embodiment is preprogrammed with a minimum baseline operating temperature associated with the food substance, which may be stored in computer readable medium 126b (e.g. memory). The control circuitry 126 is configured to form an electrical/electronic interlock with the pump motor 154 such that the motor and pump 133 cannot be started or actuated unless the real-time measured food substance temperature meets or exceeds the preprogrammed baseline operating temperature. The baseline operating temperature corresponds to the desired or ideal temperature for dispensing the food substance in liquid form (e.g. proper viscosity) to prevent clogging the dispensing mechanism.

The control circuitry 126 may further be operable to continuously maintain the temperature of the food substance FS in reservoir 131 at or above the preprogrammed baseline operating temperature. For a variety of food substances such as butter, the viscosity varies proportionally to temperature. Accordingly, measuring actual temperature of the food substance via temperature sensor 193 provides a corresponding indication of its viscosity.

The dispensing unit 102 may further include a status indication system which provides system status information to the user about the various operational stages of unit. The status indication system may be configured to provide visual and/or audible information and alerts to the user. In one embodiment, referring to FIGS. 2, 5, and 14, a visual status indication system may include a control light display comprising a status light board 195 including electronic circuitry and one or more color-changing status lights 198, such as without limitation LEDs (light emitting diodes). In one embodiment, the light board 195 may be mounted inside the rear housing 121 of dispensing unit 102 adjacent to an elongated opening. A light guide ring 196 and clear or translucent trim strip or lens cover 197 may be provided which are mounted on the rear housing 121 adjacent the light board 195 to protect the LEDs while allowing their visual observance by a user.

Operation of the status lights 198 may be controlled by main control circuitry 126 in cooperation with the light board 195 and temperature sensor 193 previously described herein. Light board 195 therefore may be operably and communicably coupled to the control circuitry 126 via communication passageways such as wiring. In one embodiment, temperature sensor 193 (shown in FIG. 5) may be used to provide the following temperature-based information to the user via status lights 198: dispensing unit 102 status light RED flashing—remind user put dispensing unit on the base 104 to reheat the food substance; dispensing unit status light steady RED—the dispensing unit starts heating food substance in reservoir 131; dispensing unit status light BLUE flashing—the user can use the dispensing unit to spray the food substance; and dispensing unit status light steady BLUE—food substance (e.g. butter) is 100% melted.

Numerous variations of the status light operation and signaling may be used including different and/or additional status light indications.

A method for heating and dispensing a food substance in a liquid state will now be briefly described. In this example process, the food substance is at least partially solid food substance at typical ambient room temperatures (e.g. approximately 73 degrees F.), such as without limitation a stick or pieces of butter. It will be appreciated that the order or sequence for performing the following steps may be rearranged and changed. Accordingly, the variations in the sequence are possible.

The method comprises first removing the top cover 123, inserting the food substance into the reservoir 131, and replacing the top cover. The charging base 104 may first be connected and plugged into an available electrical outlet if not already connected. The base indicator light 200 (see, e.g. FIG. 2) may light steady "RED" to indicate the base is energized. The dispensing unit 102 is then placed on the base 104, which may causes the base indicator light 200 to light steady "GREEN" if the unit is properly place on and electrically coupled to the base. This triggers the control circuitry 126 to automatically energize the heating band 132. The status lights 198 of dispensing unit 102 may light steady "RED" initially to indicate that the dispensing unit has started the heating cycle to heat and melt the food substance forming a liquid.

Temperature sensor 193 continuously measures the real-time actual temperature of the food substance in reservoir 131, which is monitored by the control circuitry 126 and compared the preprogrammed minimum baseline operating temperature as previously described herein. The control circuitry is configured to interlock and prevent the pump 133 from being activated until the temperature reaches the preprogrammed minimum baseline operating temperature, as previously described herein.

Once the food substance reaches the preprogrammed minimum baseline operating temperature indicating that the food substance (e.g. butter) has fully melted and is in liquid form at proper temperature ready for dispensing (e.g. minimum baseline operating temperature of 140 degrees F. in one non-limiting example), the dispensing unit status lights 198 may light flashing "BLUE." The control circuitry 126 may be configured to continuously maintain the baseline operating temperature of 140 degrees F. while the dispensing unit 102 remains attached to the base 104. When the dispensing unit is removed, the control circuitry 126 may be configured to de-energize the heating band 132 while the dispensing unit is in user by the user.

Figure 18:
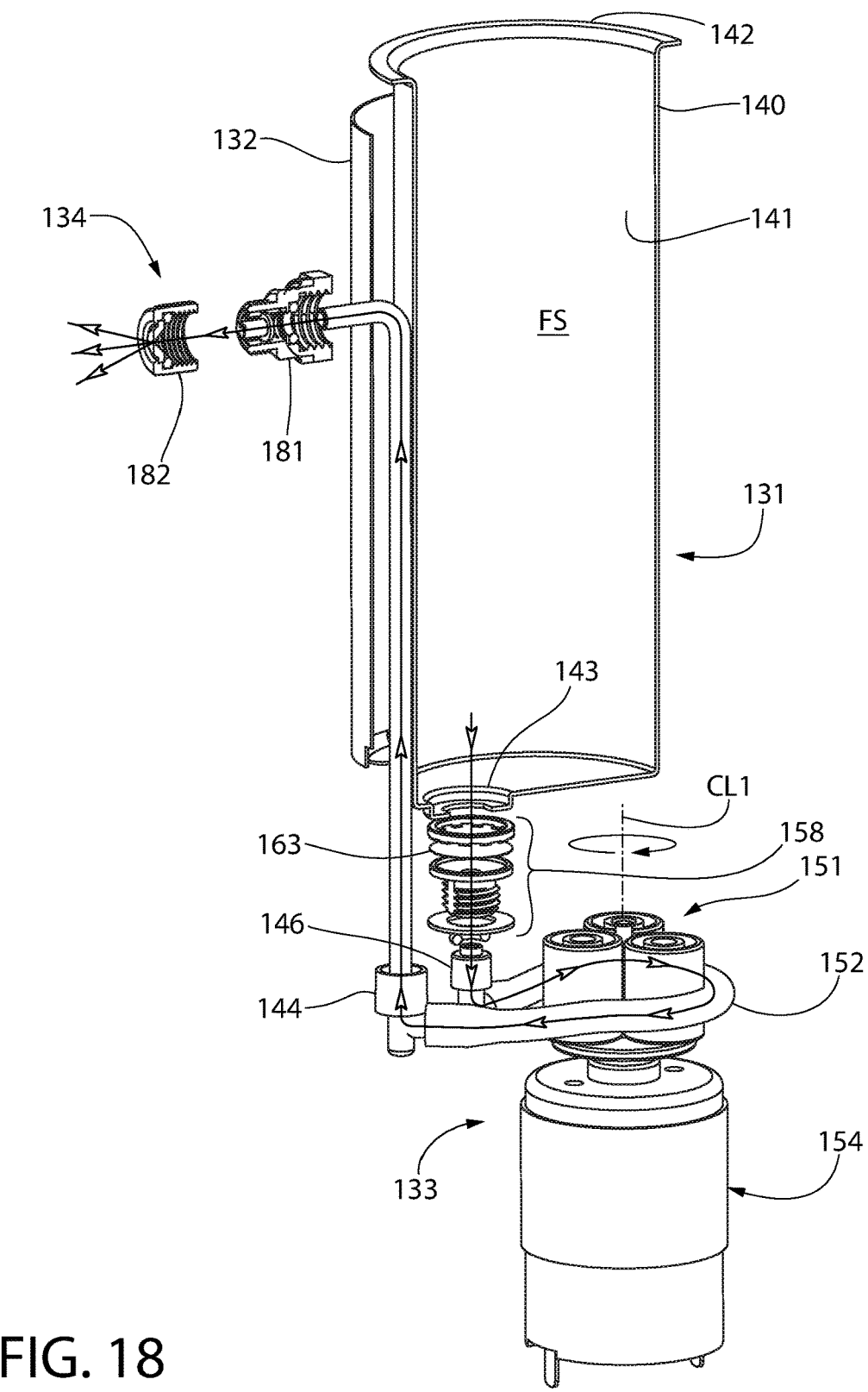
FIG. 18 is an exploded view of the dispensing system and dispensing flow path of the dispensing unit with covers and other appurtenances removed for clarity.
Figure 19:
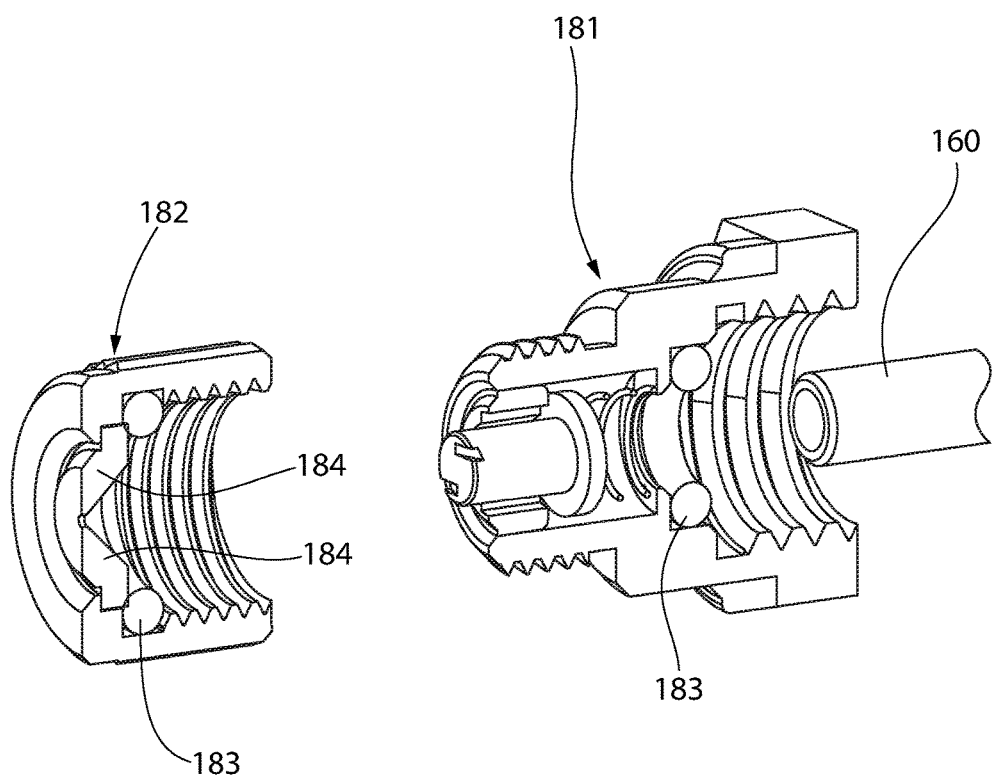
FIG. 19 is an exploded perspective view of the dispensing nozzle assembly.
Figure 20:
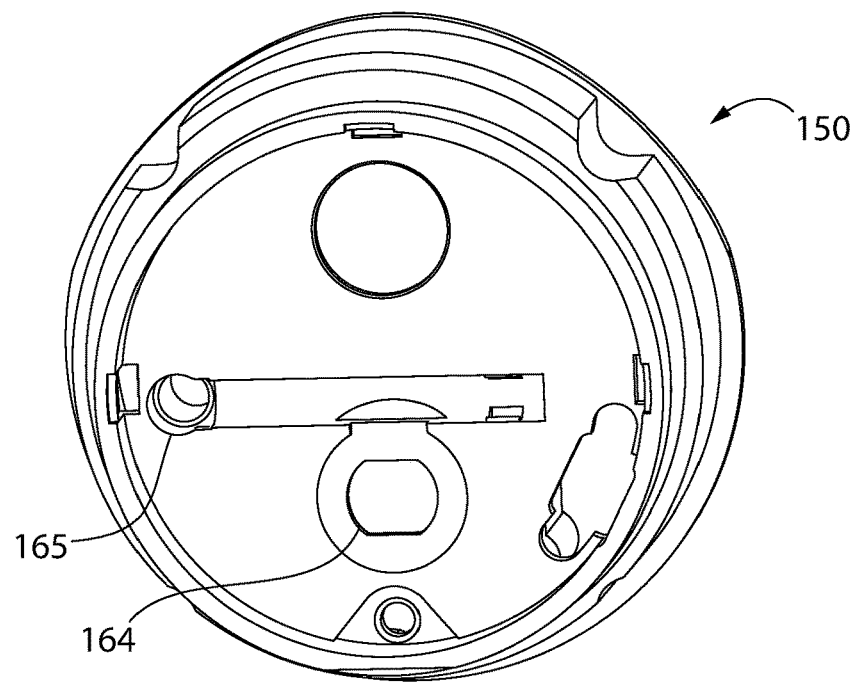
FIG. 20 is a top perspective view of the upper pump cover.
Figure 21:
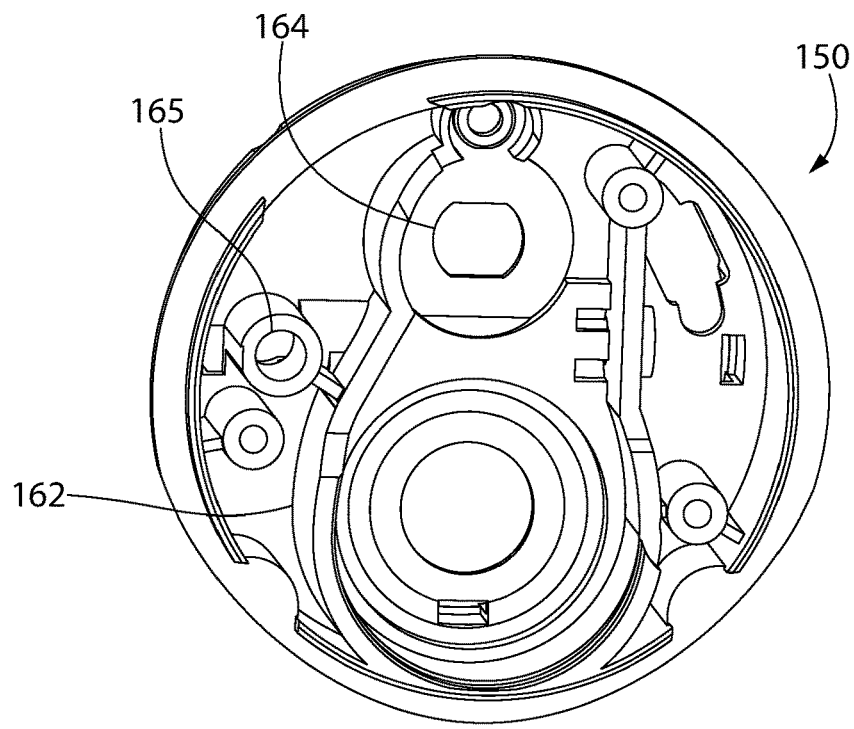
FIG. 21 is a bottom perspective view thereof.

The dispensing unit 102 may then be removed from base 104 and used to dispense/spray the liquid food substance via depressing the actuator button 190 on the dispensing unit which activates and rotates the pump 133 in a first dispensing direction. FIG. 18 shows the liquid dispensing flow path (see directional flow arrows). In one embodiment, the dispensing unit may be configured to operate such that continuously holding the button 190 down in a depressed position will continuously spray the liquid food substance. Releasing the button 190 stops dispensing the liquid.

In some embodiments, releasing the actuator button 190 also may automatically trigger a pump auto-reverse feature. The control circuitry 126 detects release of actuator button 190 after it has been depressed and stops the pump 133. The act of releasing the button 190 detected by the control circuitry transmits a signal from the circuitry to run the pump 133 for a preprogrammed short time duration in a second reverse direction such as via reversing rotation of the motor whose operation is controlled by the circuitry. This creates a vacuum which draws the liquid within the dispensing tube 160, nozzle assembly 134, and pump flow tube 152 back through the pump and into the reservoir 131 until the next dispensing action. Advantageously, this clears the dispensing system, thereby preventing or minimizing food substance clogs in the dispensing flow path components.

The temperature sensor 193 and control circuitry 126 will continuously monitor the actual temperature of the liquid in the reservoir 131 during the dispensing cycle while the dispensing unit is in use. When the liquid cools to second preprogrammed minimum dispensing temperature (e.g. 113 degrees F. in one non-limiting example) lower than the preprogrammed baseline operating temperature, the control circuitry 126 may trigger the dispensing unit status lights 198 to light flashing "RED." This is a visual indication or hint to the user that the dispensing unit 102 should be placed back on the charging base 104 to reheat the food substance to the baseline operating temperature. Maintaining the temperature of the liquid food substance (e.g. butter) in the reservoir A timer circuit may be incorporated in the control circuitry 126 which includes a preprogrammed time limit. If the time limit is reached and the control circuitry does not sense that the user has not re-engaged the dispensing unit 102 with the base 104, the control circuitry automatically shuts the dispensing unit off to prevent clogging the dispensing tube or nozzle assembly.

In the foregoing process, it bears noting that the control circuitry 126 of dispensing unit 102 was configured (i.e. preprogrammed) to initiate the heating cycle for melting the at least partially solid food substance only upon placement of the dispensing unit 102 onto the charging base 104. The heating band 132 is thus electrically powered via electrical connection to the base 104. This advantageously conserves the runtime of the onboard rechargeable battery 101 in the dispensing unit 102 for pumping/spraying the food substance and operation of the status lights 198 and temperature sensor 193 after the dispensing unit has been separated from the base 104. In other possible arrangements, the control circuitry 126 may be configured to also energize the heating band 132 when the dispensing unit 102 is removed from the base to maintain the temperature of the food substance in a liquid form. It is evident to one skilled in the art that numerous control and operating variations are thus possible.

Advantages of the present dispensing system include the following. The filter in the pump intake fluid coupling assembly, such as for example a hole with a diameter of 0.1 mm can filter large particles such as butter grease into the butter spraying system. The heating system heats the butter to the desired minimum baseline operating temperature (e.g. 140 degrees F. for butter) and keeps at a constant temperature. The heater band 132 heats the pump dispensing tubing 160 and maintains the preprogrammed minimum baseline operating temperature, which makes sure that the butter in the dispensing tubing is and remains fully melted in liquid form. The resilient and flexible structure of the heating band maintains conformal contact with substantially the entirety of the reservoir to even heat and maintain the temperature of the liquefied butter. The dispensing nozzle assembly 134 is heated through the heat conduction from the pump dispensing tubing 160 to prevent the butter from solidifying and clogging inside. The peristaltic pump motor 154 automatically reverses after the butter stops spraying, which evacuates residual liquefied butter from the dispensing tube 160, dispensing nozzle assembly 134, and pump flow tube 152 which is pumped back to the reservoir 131 to prevent clogs in the dispensing system and reduce the residues inside for preventing bacterial contamination between cleanings. By intelligently monitoring the temperature of the liquefied butter within the dispensing unit 102 during use via the control circuitry 126 (which temperature corresponds directly to the viscosity of the butter), the control circuitry controls the pump so that the pump motor 154 responds to the spraying function only after the butter is in a completely melted state and in an appropriate temperature and viscosity level or range for dispensing which prevents clogs.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A dispensing unit for heating and dispensing a food substance in a liquid state comprising:
    an elongated housing defining a longitudinal axis;
    a reservoir disposed in the housing and configured for receiving a food substance;
    a heating element operable to melt the food substance in the reservoir to produce a liquid;
    a motor-operated pump in fluid communication with the reservoir for pumping the liquid;
    a dispensing nozzle mounted to the housing;
    a dispensing tube fluidly coupling the dispensing nozzle to the pump;
    a manually-operated actuator configured to selectively activate the pump, the actuator being alterable between an actuated and a deactuated state;
    control circuitry operably coupled to the pump and actuator;
    wherein the pump is alterable between a normal operating direction which dispenses the liquid from the reservoir, and a reverse operating direction which draws the liquid from the dispensing tube back through the pump and into the reservoir to clean the dispensing tube for preventing clogs.

2. The dispensing unit according to claim 1, wherein the control circuitry is configured such that moving the actuator from the actuated state to the deactuated state automatically reverses direction of the pump which draws the liquid from the dispensing tube back through the pump and into the reservoir.

3. The dispensing unit according to claim 1, wherein the pump is a peristaltic pump comprising at least one rotating element engageable with a flexible compressible pump tube fluidly coupled between the reservoir and dispensing tube.

4. The dispensing unit according to claim 3, wherein the pump tube is U-shaped.

5. The system according to claim 1, wherein the pump comprises a pump cover coupled to and supporting a bottom end of the reservoir, the pump cover having an intake port fluidly coupling the reservoir to a first inlet end of the pump tube.

6. The dispensing unit according to claim 1, wherein the control circuitry is further configured to activate a timer and run the pump for a preprogrammed time duration in the reverse operating direction.

7. The dispensing unit according to claim 1, further comprising a motor operably coupled to the pump and control circuitry, wherein the control circuitry is configured to rotate the motor in a first direction for dispensing the liquid from the pump and a second reverse direction for drawing the liquid back out of the dispensing tube into the pump.

8. The dispensing unit according to claim 7, further comprising a rechargeable battery in the housing operably coupled to the motor.

9. The system according to claim 8, wherein the housing of the dispensing unit is configured for detachable coupling to a powered charging base, the base operable to recharge the battery.

10. The system according to claim 1, wherein the heating element comprises an arcuately curved cylindrical heating band having a resiliently deformable structure with elastic memory and a vertical slit extending between the top and bottom ends of heating band to allow for circumferential expansion of the band, the band having an undeformed diameter slightly smaller than the reservoir, and wherein the heating band is changeable between an undeformed contracted state and a deformed expanded state when positioned on the reservoir in conformal contact.

11. The system according to claim 1, wherein the heating band has a monolithic solid structure extending for substantially an entire height of the reservoir.

12. The system according to claim 1, wherein the dispensing tube extends vertically from the pump to the dispensing nozzle and is disposed between the housing and heating band.

13. The system according to claim 12, wherein the dispensing tube is L-shaped comprising a vertical section in direct thermal contact with the heating band which heats the dispensing tube and a shorter horizontal section fluidly coupled to the nozzle.

14. The system according to claim 10, wherein the heating band is in direct thermal contact with a majority of the dispensing tube to heat the tube for preventing the liquid from solidifying.

15. A dispensing system for heating and dispensing a food substance in a liquid state comprising:
    an elongated dispensing unit having housing defining a longitudinal axis, the dispensing unit comprising;
    a reservoir disposed in the housing and configured for receiving a food substance;
    a heater in thermal contact with the reservoir and operable to melt the food substance therein to produce a liquid;
    a pump in fluid communication with the reservoir for pumping the liquid;
    a rechargeable battery;

an actuator configured to selectively activate the pump, the actuator being alterable between an actuated and a deactuated state;

a dispensing nozzle supported by the housing;

a dispensing tube fluidly coupling the pump to the dispensing nozzle;

a temperature sensor operable to measure a real-time temperature of the liquid in the reservoir; and control circuitry operably coupled to the temperature sensor, heater, and pump;

a charging base having a power supply, the base configured for detachably receiving the dispensing unit and electrically coupling the rechargeable battery to the power supply;

wherein placing the dispensing unit on the base triggers the control circuitry of the dispensing unit to automatically energize the heater and heat the food substance to a preprogrammed baseline operating temperature.

16. The system according to claim 15, wherein the temperature sensor continuously measures the real-time actual temperature of the food substance in reservoir, which is monitored by the control circuitry and compared to the preprogrammed baseline operating temperature, and wherein the control circuitry is configured to continuously maintain the baseline operating temperature of while the dispensing unit remains attached to the base.

17. The system according to claim 16, wherein when the dispensing unit is removed from the base, the control circuitry is configured to automatically de-energize the heating band for conserving battery life.

18. The system according to claim 15, wherein when dispensing unit is removed from the base and the liquid cools to a preprogrammed minimum dispensing temperature lower than the preprogrammed baseline operating temperature, the control circuitry is configured to generate a visual signal to a user to return the dispensing unit to the base for reheating the liquid in the reservoir.

19. The system according to claim 18, further comprising a timer circuit is incorporated in the control circuitry which includes a preprogrammed time limit, wherein if the time limit is reached and the control circuitry does not sense that the user has re-engaged the dispensing unit with the base, the control circuitry automatically shuts the dispensing unit off to prevent clogging the dispensing tube or nozzle assembly.

20. The system according to claim 15, wherein the control circuitry is configured to interlock and prevent the pump from being activated until the temperature of the liquid in the reservoir reaches the preprogrammed minimum baseline operating temperature.

* * * * *